United States Patent
Lim et al.

(10) Patent No.: US 10,880,148 B2
(45) Date of Patent: Dec. 29, 2020

(54) APPARATUS AND METHOD FOR FREQUENCY LATTICE MODULATION IN WIRELESS COMMUNICATION SYSTEM

(71) Applicants: Samsung Electronics Co., Ltd, Suwon-si (KR); Postech Academy-Industry Foundation, Pohang-si (KR)

(72) Inventors: Jongbu Lim, Seoul (KR); Namyoon Lee, Pohang-si (KR); Jiwook Choi, Pohang-si (KR); Chanhong Kim, Suwon-si (KR); Yeohun Yun, Hwaseong-si (KR); Sungnam Hong, Suwon-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 0 days.

(21) Appl. No.: 16/639,711

(22) PCT Filed: Aug. 17, 2018

(86) PCT No.: PCT/KR2018/009454
§ 371 (c)(1),
(2) Date: Feb. 17, 2020

(87) PCT Pub. No.: WO2019/035688
PCT Pub. Date: Feb. 21, 2019

(65) Prior Publication Data
US 2020/0220764 A1 Jul. 9, 2020

(30) Foreign Application Priority Data
Aug. 17, 2017 (KR) .................. 10-2017-0104158

(51) Int. Cl.
*H04B 7/0456* (2017.01)
*H04L 27/36* (2006.01)
(Continued)

(52) U.S. Cl.
CPC .......... *H04L 27/36* (2013.01); *H04B 7/0456* (2013.01); *H04L 1/0631* (2013.01); *H04L 25/03* (2013.01); *H04L 27/3416* (2013.01)

(58) Field of Classification Search
CPC ... H04B 7/0639; H04B 7/0456; H04B 7/0482
See application file for complete search history.

(56) References Cited

U.S. PATENT DOCUMENTS 4,933,956 A * 6/1990 Forney, Jr. ........ H03M 13/1505
375/285
6,404,820 B1 6/2002 Postol
(Continued)

FOREIGN PATENT DOCUMENTS

WO 2017/074405 A1 5/2017

OTHER PUBLICATIONS

Hoang Anh Ngo et al., "Space-Time-Frequency Shift Keying for Dispersive Channels", IEEE Signal Processing Letters, vol. 18, No. 3, Mar. 2011, p. 177-180.
(Continued)

*Primary Examiner* — Kevin Kim

(57) ABSTRACT

The disclosure relates to a pre-5$^{th}$-Generation (5G) or 5G communication system to be provided for supporting higher data rates Beyond 4$^{th}$-Generation (4G) communication system such as long term evolution (LTE). According to various embodiments, a transmission device in a wireless environment may include a transceiver, and a processor operatively coupled to the transceiver. The processor may be configured to generate a codeword related to transmission data, generate symbols from the codeword by using a plurality of trans- (Continued)

mission symbol vectors determined using a linear combination of vectors corresponding to respective rows of a lattice generation matrix, and transmit a signal generated based on the symbols via the transceiver.

20 Claims, 18 Drawing Sheets

(51) Int. Cl.
  *H04L 1/06* (2006.01)
  *H04L 25/03* (2006.01)
  *H04L 27/34* (2006.01)

(56) References Cited

U.S. PATENT DOCUMENTS

2016/0233979 A1  8/2016  Koike-Akino
2017/0019288 A1  1/2017  Sagong et al.

OTHER PUBLICATIONS

Shinya Sugiura et al., "Coherent and Differential Space-Time Shift Keying: A Dispersion Matrix Approach", IEEE Transactions on Communications, vol. 58, No. 11, Nov. 2010, p. 3219-3230.

Hoang Anh Ngo et al., "Area Spectral Efficiency of Soft-Decision Space-Time-Frequency Shift-Keying-Aided Slow-Frequency-Hopping Multiple Access", IEEE Transactions on Vehicular Technology, vol. 61, No. 3, Mar. 2012, p. 1433-1439.

Mohammed Al-Attraqchi, "An Enhanced Multicarrier Modulation System for Mobile Communications", Newcastle University, Oct. 2012, 158 pages.

Sungnam Hong et al., "Frequency and Quadrature-Amplitude Modulation for Downlink Cellular OFDMA Networks", IEEE Journal on Selected Areas in Communications, vol. 32, No. 6, Jun. 2014, p. 1256-1267.

Rui Fan et al., "Generalization of Orthogonal Frequency Division Multiplexing With Index Modulation", IEEE Transactions on Wireless Communication, vol. 14, No. 10, Oct. 2015, p. 5350-5359.

Ertugrul Basar et al., "Orthogonal Frequency Division Multiplexing With Index Modulation", IEEE Transactions on Signal Processing, vol. 61, No. 22, Nov. 15, 2013, p. 5536-5549.

William Liu, "Physical Layer Network Coding Using Lattice Codes", 2016, 177 pages.

International Search Report dated Dec. 21, 2018 in connection with International Patent Application No. PCT/KR2018/009454, 2 pages.

Written Opinion of the International Searching Authority dated Dec. 21, 2018 in connection with International Patent Application No. PCT/KR2018/009454, 6 pages.

* cited by examiner

APPARATUS AND METHOD FOR FREQUENCY LATTICE MODULATION IN WIRELESS COMMUNICATION SYSTEM

CROSS-REFERENCE TO RELATED APPLICATIONS

This application is a 371 of International Application No. PCT/KR2018/009454 filed on Aug. 17, 2018, which claims priority to Korean Patent Application No. 10-2017-0104158 filed on Aug. 17, 2017, the disclosures of which are herein incorporated by reference in their entirety.

1. Field

The disclosure relates in general to a wireless communication system, and in particular, to an apparatus and method for frequency lattice modulation (FLM) in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Various index modulation schemes have been recently proposed to transmit additional information according to whether a subcarrier is active. There is a need for a method of decreasing an error rate by considering a multidimensional constellation when a signal is transmitted/received through the index modulation scheme.

Based on the above discussion, various embodiments can provide an apparatus and method for decreasing an error rate by generating a transmission symbol vector on the basis of a lattice generation matrix.

Advantageous effects of the present document are not limited to the aforementioned advantageous effects, and other unmentioned advantageous effects can be clearly understood by those skilled in the art from descriptions below.

SUMMARY

According to various embodiments of the disclosure, a transmission device in a wireless environment may include a transceiver, and a processor operatively coupled to the transceiver. The processor may be configured to generate a codeword related to transmission data, generate symbols from the codeword by using a plurality of transmission symbol vectors determined using a linear combination of vectors corresponding to respective rows of a lattice generation matrix, and transmit a signal generated based on the symbols via the transceiver.

According to various embodiments of the disclosure, a reception device in a wireless environment may include a transceiver, and a processor operatively coupled to the transceiver. The processor may be configured to receive a signal via the transceiver, identify a symbol vector included in a received signal among a plurality of symbol vectors determined using a linear combination of vectors corresponding to respective rows of a lattice generation matrix, and generate data for the signal on the basis of the identified symbol vector.

According to various embodiments, a method of operating a transmission device in a wireless environment may include generating a codeword related to transmission data, generating symbols from the codeword by using a plurality of transmission symbol vectors determined using a linear combination of vectors corresponding to respective rows of a lattice generation matrix, and transmitting a signal generated based on the symbols.

An apparatus and method according to various embodiments of the disclosure can decrease an error rate by generating a transmission symbol vector on the basis of a lattice generation matrix.

An apparatus and method according to various embodiments of the disclosure can improve energy efficiency by generating a transmission symbol vector in an ascending order of power, thereby decreasing an error rate.

Advantageous effects that can be obtained in the disclosure are not limited to the aforementioned advantageous effects, and other unmentioned advantageous effects can be clearly understood by one of ordinary skill in the art to which the disclosure pertains from the description below.

DETAILED DESCRIPTION

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

Since various embodiments of the disclosure include a technique in which hardware and software are both used, the various embodiments of the disclosure may include a hardware-based approach or a software-based approach.

Terms used hereinafter to refer to a mathematical expression (e.g., a matrix, a vector) of a signal, a mathematical expression (e.g., integer, zero, natural number) for a value of the signal, a constitutional element (e.g., a communication unit, a processor, a frequency lattice modulation unit) of a device, or the like are exemplified for convenience of explanation. Therefore, the disclosure is not limited to the terms described below, and thus other terms having the same technical meaning may also be used.

Hereinafter, the disclosure relates to an apparatus and method for modulating a signal. Specifically, the disclosure describes operations for modulating a signal through a frequency lattice modulation scheme in a wireless communication environment to decrease an error rate and increase frequency efficiency.

Terms used hereinafter to refer to control information, an operation state (e.g., operation, process), data (e.g., symbol, symbol vector, value), a constitutional element of a device, or the like are exemplified for convenience of explanation. Therefore, the disclosure is not limited to the terms described below, and thus other terms having the same technical meaning may also be used.

Figure 1:
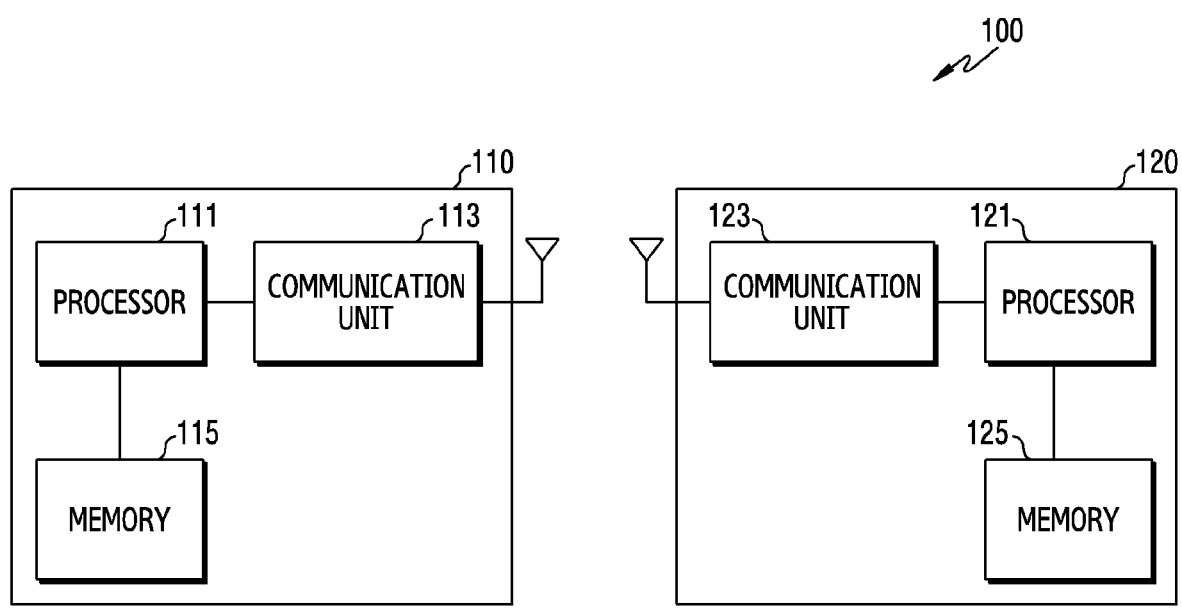
FIG. 1 illustrates an example of a functional structure of a transmission device and a reception device in a wireless communication system according to various embodiments.

FIG. 1 illustrates an example of a functional structure of a transmission device and a reception device in a wireless communication system according to various embodiments. As part of nodes using a wireless channel in a wireless communication system, a transmission device 110 and a reception device 120 are exemplified in FIG. 1. A wireless communication environment 100 may include the transmission device 110 and the reception device 120.

Referring to FIG. 1, the transmission device 110 may transmit a signal to the reception device 120. The reception device 120 may receive the signal from the transmission device 110. The transmission device 110 and the reception device 120 are identified based on a signal transmission direction. Therefore, one device may operate as the transmission device 110 or the reception device 120. For example, in downlink communication, the transmission device 110 may be a base station, and the reception device 120 may be a terminal. For another example, in uplink communication, the transmission device 110 may be a terminal, and the reception device 120 may be a base station. In addition, in device to device (D2D) communication, the transmission device 110 may be a terminal, and the reception device 120 may be another terminal. Herein, the D2D communication may be referred to as sidelink communication. In addition, the transmission device 110 may be a base station, and the reception device 120 may be another base station. In some embodiments, the transmission device 110 and the reception device 120 may perform signaling through a backhaul. The backhaul may be a wireless backhaul. In addition to the aforementioned examples, the transmission device 110 and the reception device 120 may be various other devices.

Herein, the base station is a network infrastructure for providing a radio access to the terminal. The base station may be referred to as an 'access point (AP)', an 'eNodeB (eNB)', a '5$^{th}$ Generation (5G) node', a '5G NodeB (NB)', a 'wireless point', a 'transmission/reception point (TRP)', or other terms having equivalent technical meanings.

Herein, as a device used by a user, the terminal performs communication with the base station through a wireless channel. Optionally, the terminal may be operated without user involvement. That is, as a device for performing machine type communication (MTC), the terminal may not be carried by the user. The terminal may be referred to as a 'user equipment (UE)', a 'mobile station', a 'subscriber station', a 'remote terminal', a 'wireless terminal', an 'electronic device', a 'user device', or other terms having equivalent technical meanings.

A signal transmitted from the transmission device 110 to the reception device 120 may be expressed by Equation (1) below.

$$Y=HX+Z \qquad (1)$$

Y denotes a signal received by the reception device 120, and X denotes a signal transmitted by the transmission device 110. H denotes a channel between the transmission device 110 and the reception device 120. Z denotes a noise between channels. If $N_T$ denotes the number of antennas of the transmission device 110 and $N_R$ denotes the number antennas of the reception device 120, X may be an $N_T \times 1$ matrix, Y and Z may be an $N_R \times 1$ matrix, and H may be an $N_R \times N_T$ matrix.

Hereinafter, although the transmission device and the reception device are distinctively described in FIG. 2 to FIG. 15, this is only for convenience of explanation, and thus functions of the devices are not limited to the names. In other words, optionally, the reception device 120 may transmit not only control information but also data to the transmission device 130.

Hereinafter, the term ' . . . unit', ' . . . device', or the like implies a unit of processing at least one function or operation, and may be implemented in hardware or software or in combination of the hardware and the software. In addition, since the functions of the devices are not limited to the names as described above, the following description includes not only a configuration of transmitting a signal from the transmission device 110 to the reception device 120 but also a configuration of receiving a signal from the reception device 120.

The transmission device 110 may include a processor 111, a communication unit 113, and a memory 115.

The communication unit 113 may perform functions for transmitting/receiving a signal through a wireless channel. For example, the communication unit 113 may perform a function of conversion between a baseband signal and a bit sequence according to a physical layer standard of a system. For example, in control signal transmission, the communication unit 113 may generate complex symbols by coding and modulating a transmission bit sequence. In addition, in data transmission, the communication unit 113 may up-convert a baseband signal into a radio frequency (RF) signal and thereafter transmits it through an antenna, and may down-convert an RF signal received through the antenna into a baseband signal. For example, the communication unit 113 may include an encoder, a modulator, a digital to analog converter (DAC), a transmission filter, an amplifier, a mixer, an oscillator, or the like. In addition, in data reception, the communication unit 113 may restore a reception bit sequence by demodulating and decoding the baseband signal. When the communication unit 113 receives the signal, a decoder, a demodulator, an analog to digital converter (ADC), a reception filter, or the like may be additionally included.

The communication unit 113 may include a plurality of antennas. The communication unit 113 may transmit a plurality of streams respectively through a plurality of antennas. The stream may be a data stream corresponding to a layer of the transmission device. In addition, the communication unit 113 may include a plurality of RF chains. Further, the communication unit 113 may perform beamforming. For the beamforming, the communication unit 113 may adjust phases and magnitudes of respective signals transmitted/received through a plurality of antennas or antenna elements, that is, may perform analog beamforming. Alternatively, the communication unit 113 may perform beamforming, i.e., digital beamforming, on a digital signal.

In addition, the communication unit 113 may include different communication modules to process signals of different frequency bands. Further, the communication unit 113 may include a plurality of communication modules to support a plurality of different radio access techniques. For example, the different radio access techniques may include a bluetooth low energy (BLE), a wireless fidelity (Wi-Fi), WiFi gigabyte (WiGig), a cellular network (e.g., LTE, LTE-A, $5^{th}$ generation (5G) network), or the like. In addition, the different frequency bands may include a super high frequency (SHF) (e.g., 2.5 GHz, 5GHa) band and a millimeter (mm) wave (e.g., 30 GHz, 60 GHz) band.

The communication unit 113 transmits and receive a signal as described above. Accordingly, the communication unit 113 may be referred to as a transmitter, a receiver, or a transceiver. In addition, in the following description, transmission and reception performed through a wireless channel include the aforementioned process performed by the communication unit 113.

The memory 115 may store data such as a basic program, application program, configuration information, or the like for an operation of the transmission device 110. The memory 115 may be constructed of a volatile memory, a non-volatile memory, or a combination of the volatile memory and the non-volatile memory. In addition, the memory 115 may provide stored data according to a request of the processor 111.

The processor 111 may control overall operations of the transmission device 110. For example, the processor 111 may transmit and receive a signal through the communication unit 113. In addition, the processor 111 may write data to the memory 115 and read the data. In addition, the processor 111 may perform functions of a protocol stack required in a communication standard. For this, the processor 111 may be implemented with software, may be implemented with hardware such as a chip, a circuitry, or the like, and may be implemented with a combination of the software and the hardware. The processor 111 may include one or more processors or other processing devices (e.g., controllers). For example, the processor 111 may include at least one microprocessor or micro controller. In addition, part of the communication unit 113 and the processor 111 may be referred to as a communication processor (CP). According to various embodiments, the processor 111 may provide control to perform operations of the transmission device 110 according to various embodiments described below.

The reception device 120 may include a processor 121, a communication unit 123, and a memory 125. Constitutional elements of the reception device 120 may perform functions corresponding to respective constitutional elements of the transmission device 110. The communication unit 123 may correspond to the communication unit 113. The memory 125 may correspond to the memory 115. According to various embodiments, the processor 121 may provide control to perform operations of the reception device 120 according to various embodiments described below.

Figure 2:
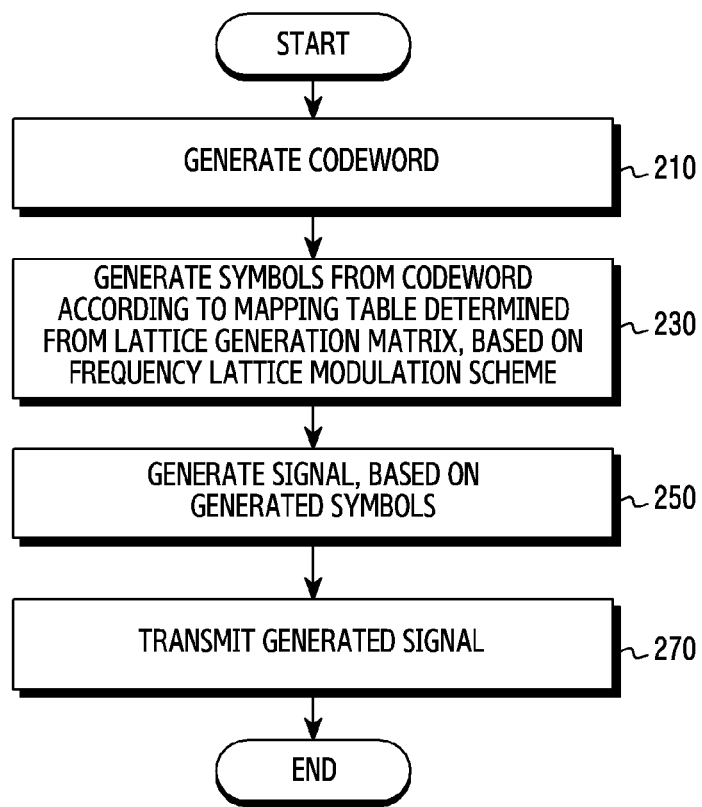
FIG. 2 illustrates an operational flow of a transmission device according to various embodiments.

FIG. 2 illustrates an operational flow of the transmission device 110 according to various embodiments.

Referring to FIG. 2, in operation 210, the processor 111 may generate a codeword. The processor 111 may generate a codeword for data to be transmitted. The processor 111 may generate the codeword by performing channel coding on transmission bit sequences of data.

In operation 230, the processor 111 may generate a symbol from the codeword on the basis of a frequency lattice modulation scheme. The processor 111 may generate a symbol according to a mapping table based on the frequency lattice modulation scheme from the codeword. Specifically, the processor 111 may divide the codeword into data of designated bits. The processor 111 may generate symbol vectors corresponding to respective divided data. Herein, the processor 111 may use the mapping table to generate the symbol vectors corresponding to the respective divided data. The processor 111 may map the data of the designated bits to the respective symbol vectors by using the mapping table. The memory 115 may store the mapping table.

The mapping table may be determined based on a lattice generation matrix based on the frequency lattice modulation scheme. Specifically, each symbol vector included in the mapping table may be determined based on the lattice generation matrix. For example, the processor 111 may generate symbol vectors on the basis of the lattice generation matrix. For another example, the processor 111 may control the memory 115 to store symbol vectors predetermined based on the lattice generation matrix.

In operation 250, the processor 111 may generate a signal on the basis of the generated symbols. For example, the processor 111 may determine symbol vectors corresponding to respective data divided from the codeword, and may generate a transmission signal on the basis of a sequence of the determined symbol vectors. For example, the processor 111 may perform subcarrier interleaving or inverse fast fourier transform (IFFT) from the sequence of the symbol vectors.

In operation 270, the processor 111 may transmit the generated signal through an antenna. The processor 111 may up-convert baseband signals, thereby controlling the communication unit 113 (e.g., the RF transceiver) to generate an RF signal transmitted through the antenna. The transmission device 110 may transmit the up-converted RF signal through the antenna.

Various embodiments may provide an apparatus and method for generating a symbol from a codeword related to transmission data. The transmission device according to various embodiments may divide the codeword into data of designated bits and may map the divided data to respective transmission symbols in order to generate a symbol from the codeword. The transmission device according to various embodiments may generate a symbol by using a sequence of transmission symbol vectors respectively corresponding to the divided data.

In various embodiments, the transmission symbol vector may be an n-dimensional vector (n is a natural number). Therefore, the n-dimensional transmission symbol vector may correspond to a constellation point in an n-dimensional constellation diagram. One n-dimensional transmission symbol vector may indicate a combination of G subcarriers (G is a natural number). The G subcarriers may constitute one subcarrier group. That is, one n-dimensional transmission symbol vector may be mapped to one subcarrier group, and one subcarrier group may include G subcarriers. The transmission device 110 may transmit a signal by using some subcarriers among the G subcarriers, and the remaining subcarriers may not be used to transmit the signal. Since the signal is transmitted by using only some subcarriers among the G subcarriers included in one subcarrier group, frequency dependency may occur in a transmission signal.

Figure 3:
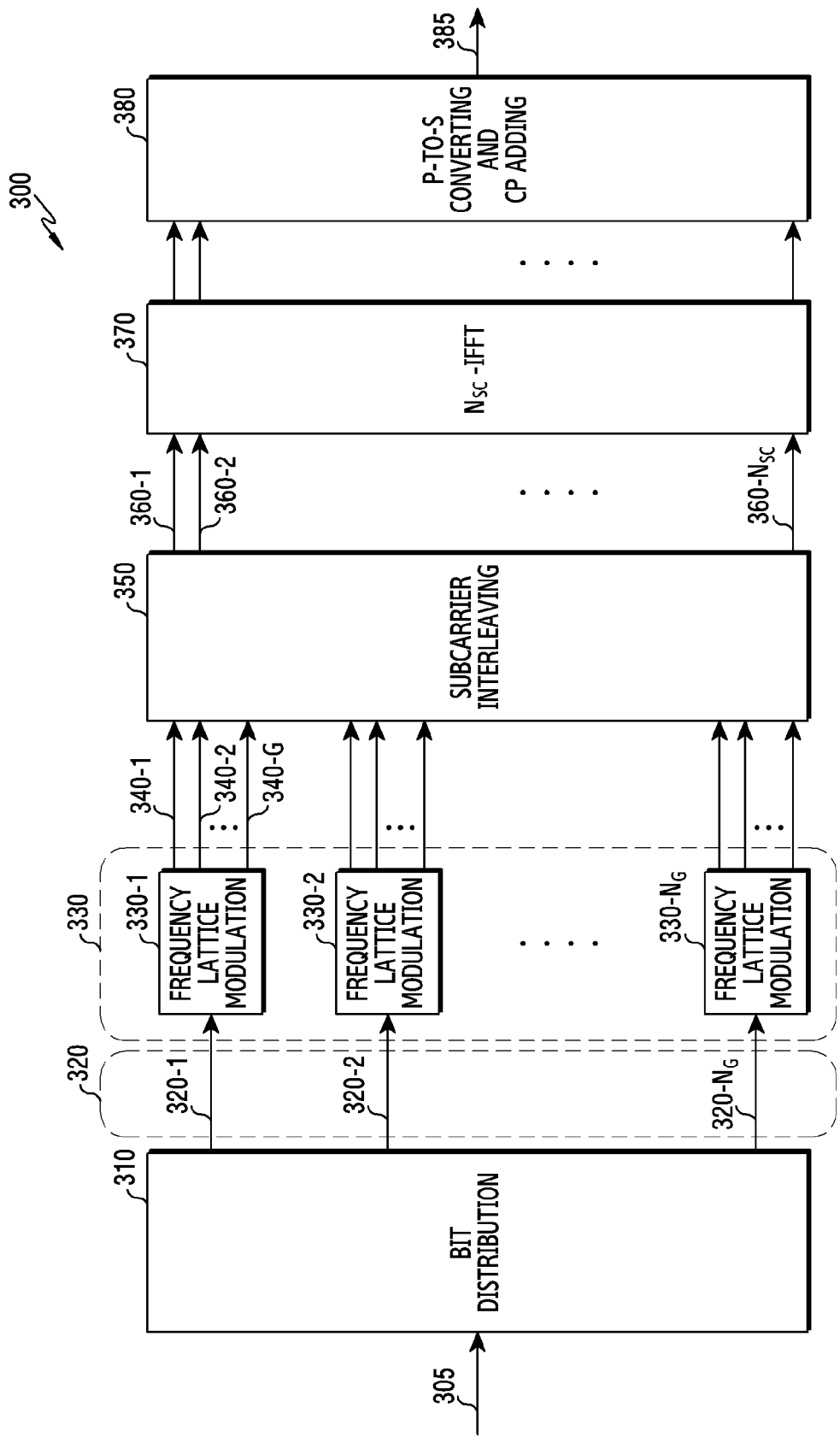
FIG. 3 illustrates an example of a functional structure of a transmission device for generating a symbol from a codeword according to various embodiments.
Figure 4:
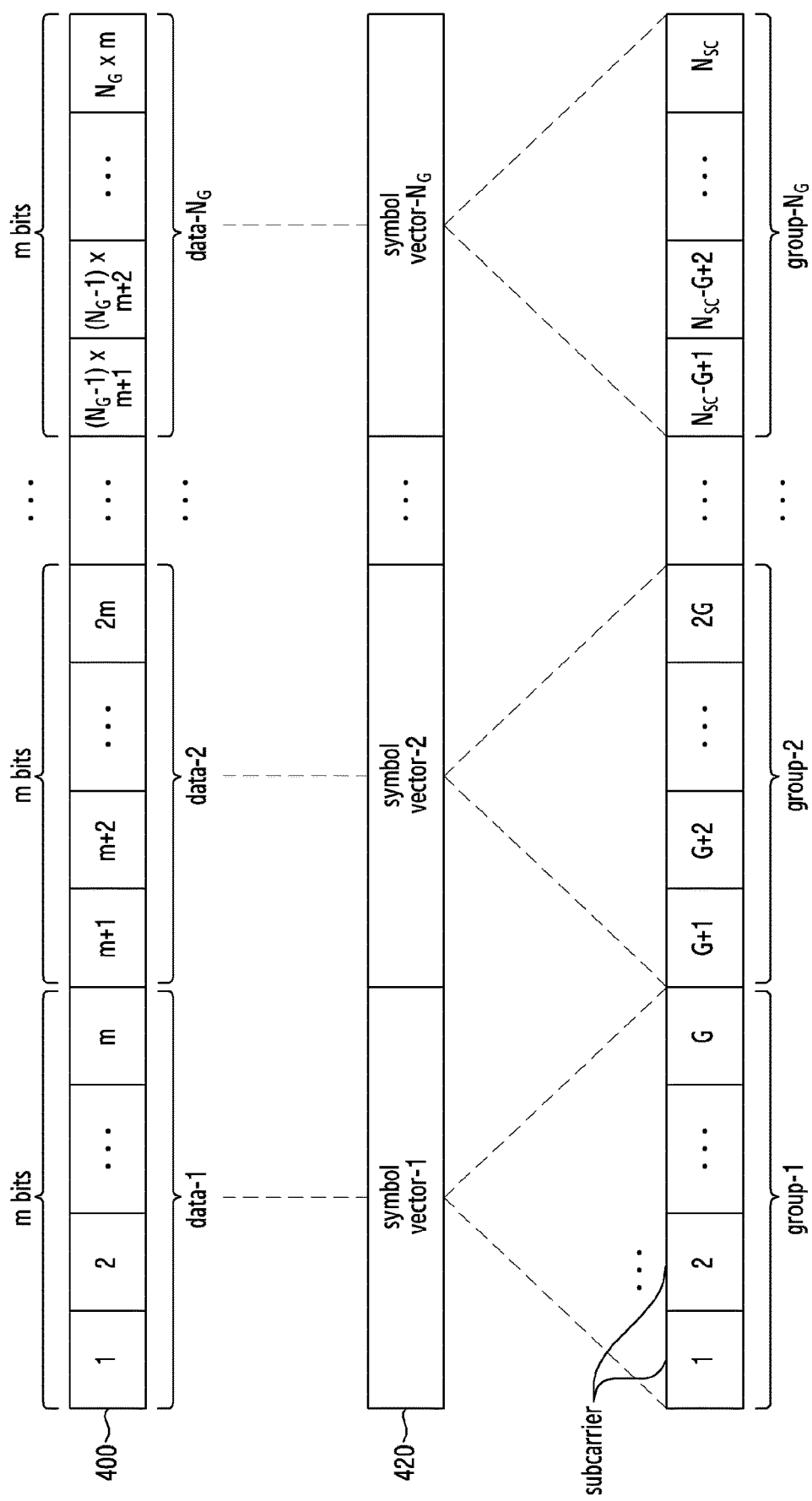
FIG. 4 illustrates an example of a relation among a codeword, transmission symbol vectors, and subcarriers according to various embodiments.

FIG. 3 illustrates an example of a functional structure of a transmission device 300 for generating a symbol from a codeword according to various embodiments. The functional structure of the transmission device 300 (e.g., the transmission device 110) is described with reference to FIG. 4. FIG. 4 illustrates an example of a relation among a codeword 400, transmission symbol vectors, and subcarriers according to various embodiments. Numeric symbols or characters shown in FIG. 4 are only examples of an index for representing respective concepts (e.g., bits, transmission symbol vectors, subcarriers, etc.), and meaning or order of each numeric symbol or character does not restrict an operation of the transmission device according to various embodiments.

Referring to FIG. 3, the transmission device 300 for generating a symbol 385 from the codeword 400 may include a bit distribution unit 310, a frequency lattice modulation (FLM) unit 330, a subcarrier interleaving unit 350, an $N_{SC}$ size IFFT applying unit 370, and a parallel-to-serial (P-to-S) converting and cyclic prefix (CP) adding unit 380. Operations for the functional structure of FIG. 3 may be performed by the processor 111 or may be performed by another constitutional element (e.g., the communication unit 113) of the transmission device 110, or may be performed by the processor 111 and another constitutional element of the transmission device 110.

The bit distribution unit 310 may receive the codeword 400 related to transmission data through a path 305. The bit distribution unit 310 may distribute the received codeword 400 to data of designated bits. For example, as shown in FIG. 4, the bit distribution unit 310 may divide the codeword 400 into data-1 to data-$N_G$ of designated bits. The data-1 to the data-$N_G$ may have designated bits (e.g., m bits). The designated bits (e.g., m bits) may be bits that can be expressed by one transmission symbol vector. For example, if a transmission symbol vector set includes $2^m$ transmission symbol vectors, the codeword may be distributed to m-bit data (e.g., data-1, data-2, data-$N_G$).

The bit distribution unit 310 may transmit the data-1 to an FLM unit 330-1 via a path 320-1. The bit distribution unit 310 may transmit the data-2 to an FLM unit 330-2 via a path 320-2. In the same or identical manner, up to the data-No may be transmitted. That is, the bit distribution unit 310 may transmit the data-$N_G$ divided from the codeword 400 to an FLM unit 330-$N_G$ via a path 320-$N_G$.

In some other embodiments, the bit distribution unit 310 may include a serial-to-parallel (S-to-P) converter, and may divide the codeword 400 into the data-1 to the data $N_G$ of designated bits (e.g., m bits) by using the S-to-P converter.

The FLM unit 330 may include the FLM unit 330-1 to the FLM unit 330-$N_G$. The FLM unit 330 may determine transmission symbol vectors (e.g., a transmission symbol vector-1, transmission symbol vector-2, and transmission symbol vector-$N_G$ of FIG. 4) to be mapped to received data (e.g., data-1, data-2, data-$N_G$). For example, as shown in FIG. 3 to FIG. 4, the FLM unit 330-1 may determine the transmission symbol vector-1 corresponding to the data-1 received via the path 320-1, and the FLM unit 330-$N_G$ may determine the transmission symbol vector-NG corresponding to the data-$N_G$ received via the path 320-$N_G$.

The FLM unit 330 may determine the transmission symbol vector-1 to transmission symbol vector-$N_G$ corresponding to the data-1 to data-$N_G$ received via a path 320. Each of the transmission symbol vectors (e.g., the transmission symbol vector-1, the transmission symbol vector-2, and the transmission symbol vector-$N_G$) may a combination of G subcarriers (where G is a natural number). That is, the G subcarriers may be used to determine one transmission symbol vector. The G subcarriers may be referred to as one subcarrier group.

For example, the transmission symbol vector-1 may correspond to a combination of G subcarriers from the subcarrier-1 to the subcarrier-G. To express the transmission symbol vector-1, the G subcarriers from the subcarrier-1 to the subcarrier-G may be used. The combination of the G subcarriers expressed by the transmission symbol vector-1 may be referred to as a subcarrier group-1. For another example, the transmission symbol vector-1 may correspond to the combination of the G subcarriers from a subcarrier-(G+1) to a subcarrier-(2G). To express the transmission symbol vector-2, the G subcarriers from the subcarrier-(G+1) to the subcarrier-(2G) may be used. The combination of the G subcarriers expressed by the transmission symbol vector-2 may be referred to as a subcarrier group-2.

In various embodiments, to express one transmission symbol vector (e.g., the symbol vector-1), only some subcarriers may be used among the G subcarriers (e.g., the subcarrier-1 to the subcarrier-G). To transmit a signal, the processor 111 may transmit the signal by using K subcarriers among the G subcarriers, and G-K subcarriers may not be used (O<K<G, where K is a natural number). Since the signal is transmitted by using only some subcarriers among the G subcarriers, a transmission signal may have frequency dependency. A subcarrier used to generate the transmission signal may be referred to as being active, and a subcarrier not used to generate the transmission signal may be referred to as being inactive.

If G subcarriers are required to express one transmission symbol vector, $G \times N_G$ subcarriers may be required to express the codeword 400 of $m \times N_G$ bits (i.e., m-bit data-1 to data-$N_G$). Therefore, the total number of subcarriers may satisfy $N_{SC} = G \times N_G$.

To modulate data (e.g., the data-1) to a transmission symbol vector (e.g., the transmission symbol vector-1), the FLM unit 330 may perform pulse amplitude modulation (PAM), phase shift keying (PSK), quadrature amplitude modulation (QAM), or a combination thereof. However, without being limited thereto, in various embodiments, the transmission device 110 may generate transmission symbol vectors (e.g., the transmission symbol vector-1, the transmission symbol vector-2, the transmission symbol vector-$N_G$) through various modulation schemes. That is, the transmission symbol vectors may correspond to various modulation schemes. The FLM unit 330 may generate a sequence 420 of the transmission symbol vectors by modulating the data-1 to data-$N_G$ divided from the codeword 400 according to various modulation schemes.

The FLM unit 330 may identify $N_{SC}$ subcarriers corresponding to the sequence 420 of the transmission symbol vectors. The FLM unit 330 may identify the subcarrier-1 to the subcarrier-$N_{SC}$ corresponding to the sequence 420 as shown in FIG. 4. The FLM unit 330 may identify bit data corresponding to the subcarrier-1 to the subcarrier-$N_{SC}$.

As shown in FIG. 3, the FLM unit 330-1 may identify the subcarrier-1 to subcarrier-G corresponding to the transmission symbol vector-1. The subcarrier-1 to the subcarrier-G correspond to a path 340-1 to a path 340-G. For example, the path 340-1 may represent a transfer path of the subcarrier-1 among subcarriers included in the subcarrier group-1 corresponding to the transmission symbol vector-1 modulated by the FLM unit 330-1. For another example, the path 340-G may represent a transfer path of the subcarrier-G among subcarriers included in the subcarrier group-1 corresponding to the transmission symbol vector-1 modulated by the FLM unit 330-1. Herein, each of the path 340-1 to the path 340-G is for identifying an operation per subcarrier, and may not imply a path of a real hardware circuit.

The subcarrier interleaving unit 350 may perform interleaving for the subcarrier-1 to the subcarrier-$N_{SC}$ or for symbols (or digital data) corresponding to the subcarrier-1 to symbols (or digital data) corresponding to the subcarrier-$N_{SC}$. The subcarrier interleaving unit 350 may perform an interleaving operation so that G subcarriers (e.g., the subcarrier-1 to the subcarrier-G) included in a subcarrier group (e.g., the subcarrier group-1) are deployed in a random order with respect to subcarriers (e.g., the subcarrier-(G+1) to the subcarrier-(2G) in case of the subcarrier group-2) included in other subcarrier groups (e.g., the subcarrier group-2 to the subcarrier group-$N_G$). A detailed description on the subcarrier interleaving will be described below with reference to FIG. 13 and FIG. 14.

The $N_{SC}$-IFFF applying unit 370 may apply IFFT on $N_{SC}$ subcarriers or symbols (or digital data) corresponding to the $N_{SC}$ subcarriers. For example, the $N_{SC}$-IFFF applying unit 370 may identify a subcarrier-1 received via a path 360-1 to a subcarrier-$N_{SC}$ received via a path 360-$N_{SC}$. The $N_{SC}$-IFFF applying unit 370 may identify symbols (or data) corresponding to the subcarrier-1 to the subcarrier-$N_{SC}$. The $N_{SC}$-IFFF applying unit 370 may apply IFFT to the identified symbol (or data). Herein, each of the path 360-1 to the path 360-$N_{SC}$ is for identifying an operation per subcarrier, and may not imply a path of a real hardware circuit.

The P-to-S converting and CP adding unit 380 may perform P-to-S conversion on symbols corresponding to $N_{SC}$ subcarriers received from the $N_{SC}$ size IFFT applying unit 370, and may add a CP.

In the aforementioned detailed description on the functional structure of the transmission device 300, a subcarrier may imply a symbol corresponding to the subcarrier, or may imply digital data corresponding to the subcarrier or the symbol.

Figure 5A:
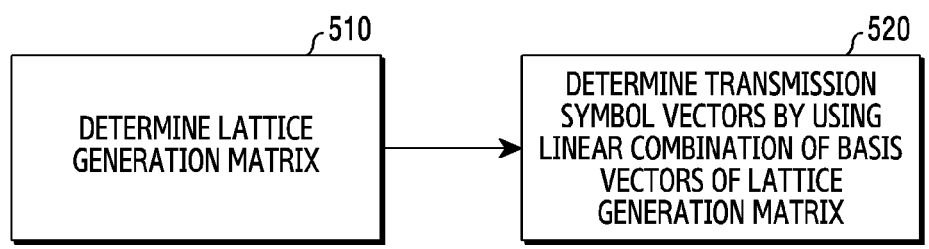
FIG. 5A illustrates an example of determining a transmission symbol vector set according to various embodiments.

FIG. 5A illustrates an example of determining a transmission symbol vector set according to various embodiments. In some embodiments, a transmission symbol vector set predetermined by the processes of FIG. 5A may be stored in the memory 115. In some other embodiments, at least part of the processes may be performed by the processor 111.

In various embodiments, the transmission symbol vector set may imply a set having all possible transmission symbol vectors as an element. For example, in order to map m-bit data to one transmission symbol vector, $2^m$ transmission symbol vectors may be required. Therefore, in order to map the m-bit data to one transmission symbol vector, the transmission symbol vector set may have $2^m$ transmission symbol vectors as an element. The transmission symbol vector-1 to transmission symbol vector-$N_G$ shown in FIG. 4 may be determined among elements (i.e., $2^m$ transmission symbol vectors) of the transmission symbol vector set.

Referring to FIG. 5A, in process 510, a lattice generation matrix may be determined. The lattice generation matrix may be a matrix on the basis of which a transmission symbol vector set is generated. In various embodiments, the transmission symbol vectors (e.g., the transmission symbol vector-1 to the transmission symbol vector-$N_G$) may be an n-dimensional vector. The transmission symbol vector set having the n-dimensional transmission symbol vectors as an element may be referred to as an n-dimensional transmission symbol vector set. In various embodiments, the lattice generation matrix for generating the n-dimensional transmission symbol vector set may be any matrix having a size of n×n and having integer elements. The lattice generation matrix for generating the n-dimensional transmission symbol vector set may be expressed by Equation (2).

$$A = \begin{pmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{pmatrix}, a_{ij} \text{ is integer} \quad (2)$$

In Equation (2), A may denote any n×n lattice generation matrix, and $a_{11}$ to $a_{nn}$, which are integers, may denote elements of the lattice generation matrix A.

In process 520, the transmission symbol vectors (i.e., elements of the transmission symbol vector set) may be determined by using linear combination of basis vectors of the lattice generation matrix. In various embodiments, the n×n lattice generation matrix may have n n-dimensional basis vectors. For example, n n-dimensional basis vectors of the lattice generation matrix A given in Equation (2) may be expressed by Equation (3).

$$a_1 = (a_{11}, a_{12}, \ldots, a_{1n})^T \qquad (3)$$
$$a_2 = (a_{21}, a_{22}, \ldots, a_{2n})^T$$
$$\vdots$$
$$a_n = (a_{n1}, a_{n2}, \ldots, a_{nn})^T$$

In Equation (3), $a_1$ to $a_n$ may denote basis vectors of the lattice generation matrix A, $a_{11}$ to $a_{1n}$ may denote elements of the basis vector $a_1$, and $a_{n1}$ to $a_{nn}$ may denote elements of the basis vector $a_n$. Basis vectors $a_1$ and $a_2$ to an of the lattice generation matrix A may denote respective rows of the lattice generation matrix A in a form of a column vector. Therefore, the n×n lattice generation matrix may have n n-dimensional basis vectors. In various embodiments, any n-dimensional transmission symbol vector may be generated by linearly combining the n n-dimensional basis vectors. The n n-dimensional basis vectors may be expressed by Equation (4).

$$x = c_1 a_1 + c_2 a_2 + \ldots + c_n a_n, (c_1, c_2, \ldots, c_n \text{ are integers}) \qquad (4)$$

In Equation (4), x may denote any n-dimensional transmission symbol vector, $a_1$ to $a_n$ may denote basis vectors of the lattice generation matrix A, and $c_1$ to $c_n$, which are any integers, may denote a coefficient of linear combination.

In various embodiments, in order to map m-bit data to one n-dimensional transmission symbol vector, $2^m$ different transmission symbol vectors x may be determined by using Equation (4). The n-dimensional transmission symbol vector set may be determined as a set of which elements are the n-dimensional transmission symbol vectors generated by using Equation (4). A detailed description on an operation of determining any target number (e.g., $2^m$) of transmission symbol vectors will be described below with reference to FIG. 5B.

Figure 5B:
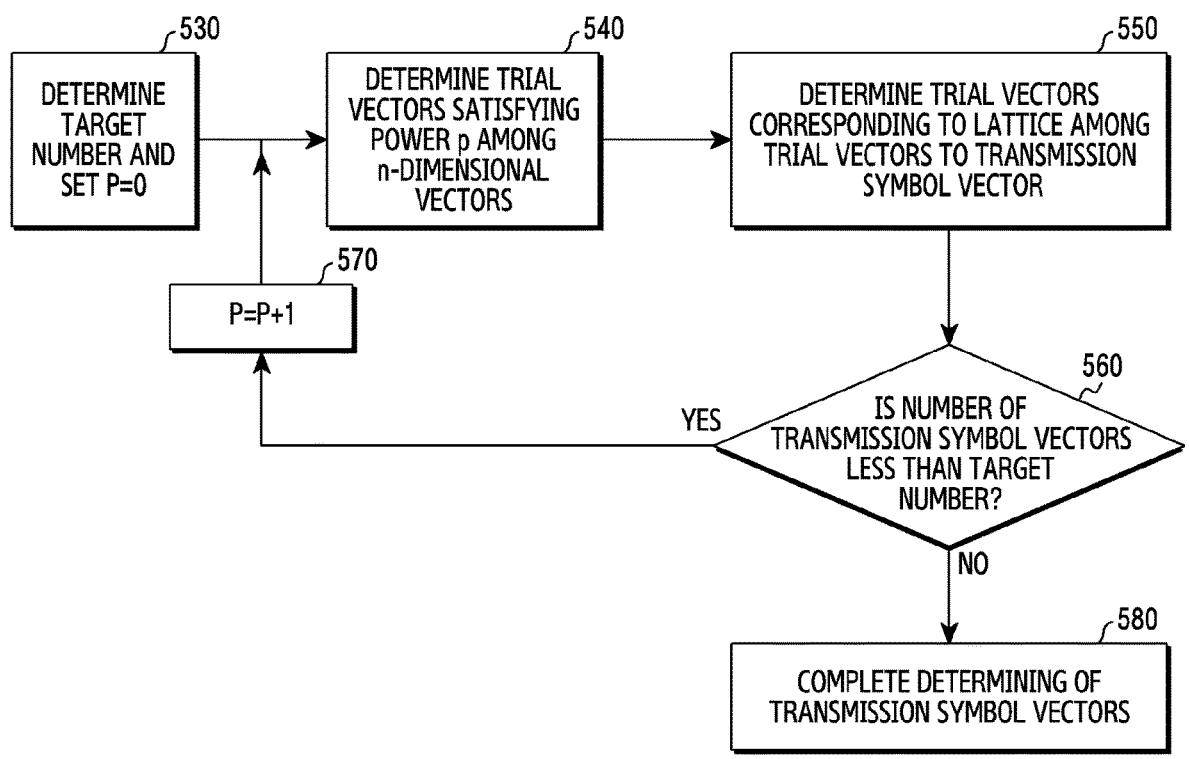
FIG. 5B illustrates an example of determining transmission symbol vectors according to various embodiments.

FIG. 5B illustrates an example of determining transmission symbol vectors according to various embodiments. In some embodiments, the number of transmission symbol vectors that can be stored in the memory 115 may be a target number predetermined by processes of FIG. 5B. In other some embodiments, at least some of processes of FIG. 5B may be performed by the processor 111.

Referring to FIG. 5B, in process 530, the target number may be determined, and a power constraint variable P may be set to 0. The target number may imply the number of transmission symbol vectors to be generated. In various embodiments, to modulate m-bit data (e.g., data-1) into one transmission symbol vector (e.g., a transmission symbol vector-1), the m-bit data (e.g., the data-1) may be mapped to one transmission symbol vector (e.g., the transmission symbol vector-1) among $2^m$ transmission symbol vectors. Herein, the target number may be set to $2^m$. For example, when it is intended to modulate 6-bit data to one transmission symbol vector, since $2^6=64$ transmission symbol vectors must be generated, the target number may be determined as 64.

In process 540, n-dimensional trial vectors satisfying power P may be identified among the n-dimensional vectors. Specifically, to generate the n-dimensional transmission symbol vectors, the n-dimensional trial vectors may be determined. The n-dimensional trial vector may be determined as vectors having the same power value as P among the n-dimensional vectors having an integer as an element. Power of the n-dimensional trial vector may imply a square of a size of the n-dimensional trial vector. That is, in case of n-dimensional trial vector $t = (t1, t2, \ldots, tn)^T$, power P of the n-dimensional trial vector may imply $t1^2 + t2^2 + \ldots + tn^2$. For example, if P is 0, a trial vector having the same power as P may be determined as $(0, 0, 0, 0)^T$, and if P is 1, the trial vector having the same power as P may be determined as $(1, 0, 0, 0)^T$, $(-1, 0, 0, 0)^T$, $(0, 1, 0, 0)^T$, $(0, -1, 0, 0)^T$, $(0, 0, 1, 0)^T$, $(0, 0, -1, 0)^T$, $(0, 0, 0, 1)^T$, $(0, 0, 0, -1)^T$. In some embodiments, to determine all possible n-dimensional trial vectors, elements of a substitution group (e.g., a symmetric group or a permutation group) of which an element is a randomly determined n-dimensional trial vector may be determined as the n-dimensional trial vector.

In process 505, among the trial vectors, trial vectors corresponding to a lattice may be determined as a transmission symbol vector. The trial vector corresponding to the lattice may imply a vector t in which $c_1$ to $c_n$ can be expressed as integers when the trial vector $t = (t1, t2, \ldots, tn)^T$ is expressed by $t = c_1 a_1 + c_2 a_2 + \ldots + c_n a_n$. That is, in order for the trial vector t to correspond to the lattice, coefficients (i.e., $c_1$ to $c_n$) must be expressed by integers when the trial vector t is expressed by linear combination of bases (i.e., $a_1$ to $a_n$) of the lattice generation matrix A. To determine whether the trial vector t corresponds to the lattice, an inverse matrix of a transposed matrix of the lattice generation matrix A may be multiplied by the trial vector t. For example, when $t = c_1 a_1 + c_2 a_2 + \ldots + c_n a_n$, $c_1$ to $c_n$ may be obtained by Equation (5).

$$\begin{pmatrix} c_1 \\ c_2 \\ \vdots \\ c_n \end{pmatrix} = (A^T)^{-1} \cdot t = (A^{-1})^T \cdot t \qquad (5)$$

In Equation (5), A may denote an n×n lattice generation matrix given in Equation (2), and t may denote an n-dimensional trial vector. If $c_1$ to $c_n$ obtained by using Equation (5) are integers, the trial vector t may be determined as a transmission symbol vector.

However, a method of determining the transmission symbol vector is not limited thereto. For example, an inverse matrix of A may be multiplied by the trial value A to obtain $c_1$ to $c_n$ according to whether a basis vector of the lattice generation matrix A is set to a vector corresponding to rows of A or a vector corresponding to columns of A. According to various embodiments, an inverse matrix of A or an inverse matrix of a transposed matrix of A may be multiplied before or after the trial vector t.

In process 560, if the determined number of transmission symbol vectors (i.e., vectors corresponding to the lattice among the trial vectors) is less than the target number, proceeding to process 570, power P may be increased by 1. Thereafter, transmission symbol vectors of which power is increased by 1 may be determined through processes 540 to 550. The processes 540 to 570 may be repeated until the determined number of transmission symbol vectors is equal to the target number.

In the process 560, if the determined number of transmission symbol vectors is not less than the target number, proceeding to process 580, determining of the transmission symbol vectors may be complete. The finally determined number of transmission symbol vectors may be equal to the target number.

Through the processes illustrated in FIG. 5B, transmission symbol vectors for frequency lattice modulation may be selected only in a column corresponding to bases of the pre-set lattice generation matrix A. In addition, the transmission symbol vectors for the frequency lattice modulation may be selected in an ascending order of power. The loss of energy and frequency efficiency may be minimized by determining the number of transmission symbol vectors to a target number in order of being close to an origin (e.g., 0 vector).

In various embodiments, since symbol vectors are generated with an FLM scheme, the symbol vectors may be evenly deployed while maximizing a distance between the symbol vectors. Since the symbol vectors are evenly deployed while maximizing the distance between the symbol vectors, an error rate may decrease for a case where the transmission device 100 fails to acquire channel information in the wireless communication environment 100.

$$D'^2_{min} = \min_{x_i \neq x_j} |x_i - x_j|^2 \quad (6)$$

In Equation (6), $D'_{min}$ may denote a minimum distance between symbol vectors, and $x_i$ or $x_j$ may denote each symbol vector.

$$E_s = \frac{\sum_{i=1}^{N} |x_i|^2}{N} \quad (7)$$

$$D^2_{min} = \frac{D'^2_{min}}{E_s} \quad (8)$$

In Equation (7), $E_S$ may denote average energy of symbol vectors included in a symbol vector set, $x_i$ may denote each symbol vector, and N may denote the number of symbol vectors included in the symbol vector set. Equation (8) may represent a method of obtaining a normalized minimum distance $D_{min}^2$ between symbol vectors by using the average energy $E_S$ and a minimum distance $D'_{min}^2$ of the symbol vectors. In Equation (8), the normalized minimum distance $D_{min}^2$ between the symbol vectors may be a value obtained by normalizing the minimum distance $D'_{min}^2$ between the symbol vectors with the average energy.

In various embodiments, when symbol vectors are generated with FLN, the normalized minimum distance $D_{min}^2$ between the symbol vectors may be increased in comparison with a case where the symbol vectors are generated with other modulation schemes (e.g., orthogonal frequency division multiplexing (OFDM), OFDM-indexing modulation (IM), OFDM-generalized index modulation (GIM), etc.). Therefore, an error rate may be decreased when the FLM is used, in comparison with a case of using other modulation schemes (e.g., OFDM, OFDM-IM, OFDM-GIM, etc.).

Hereinafter, examples of an n-dimensional (e.g., 1-dimensional, 2-dimensional, 4-dimensional) transmission symbol vector set determined according to various embodiments will be described. In addition, average energy $E_S$ of symbol vectors generated with FLM and a normalized minimum distance $D_{min}^2$ between symbol vectors generated with FLM will be described below.

Figure 6:
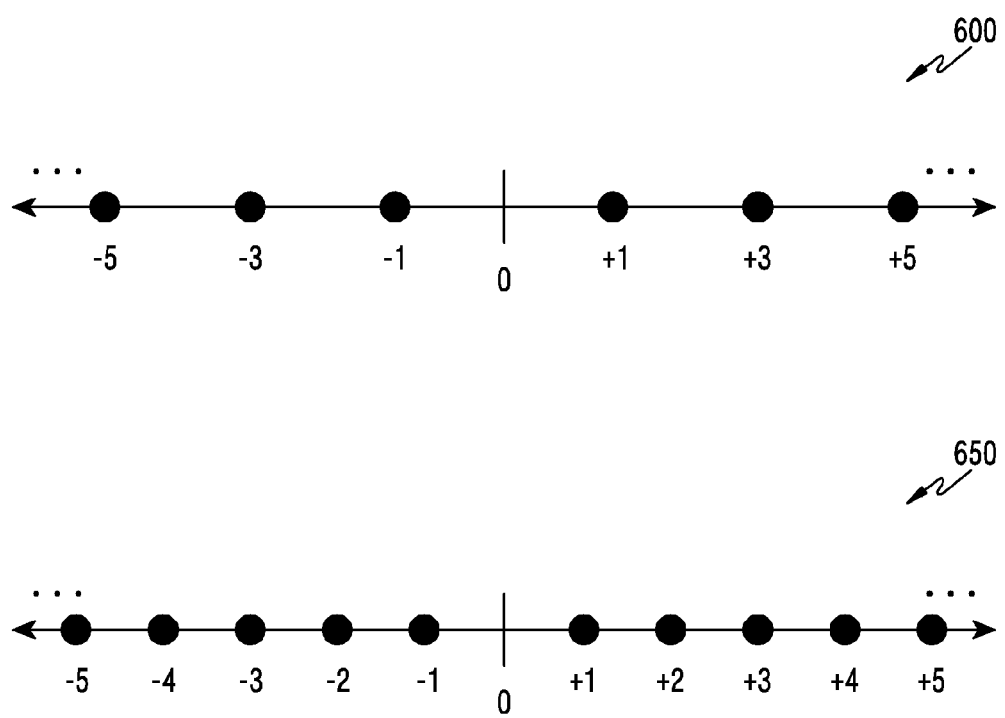
FIG. 6 illustrates an example of 1-dimensional transmission symbol vectors for a frequency lattice modulation scheme according to various embodiments.

In some embodiments, a 1×1 lattice generation matrix 1 may be used to set a 1-dimensional transmission symbol vector set. FIG. 6 illustrates an example of 1-dimensional transmission symbol vectors for a frequency lattice modulation scheme according to various embodiments.

Referring to FIG. 6, a transmission symbol vector set 600 for an M-PAM scheme having a modulation size M may be expressed by {1-M, 3-M, . . . , M−3, M−1}. Meanwhile, a 1-dimensional transmission symbol vector set 650 determined with an FLM scheme having the same modulation size M as the M-PAM may be expressed by $$\left\{-\frac{M}{2}, -\frac{M}{2}+1, \ldots, -1, +1, \ldots, +\frac{M}{2}-1, +\frac{M}{2}\right\}.$$

In order to set the 1-dimensional transmission symbol vector set 650 with the FLM scheme, the 1×1 lattice generation matrix 1 may be used. That is, the 1-dimensional transmission symbol vector set 650 for the FLM scheme may be generated with the method of FIG. 5 and FIG. 6 by using the 1×1 lattice generation matrix 1. To generate the 1-dimensional transmission symbol vector set 650, a target number may be set to the modulation size M.

In some other embodiments, in order to determine a 2-dimensional transmission symbol vector for FLM, a 2×2 lattice generation matrix may be used. Table 1 may represent a comparison between a symbol vector set that can be used in generalized index modulation (GIM) using PAM and a 2-dimensional symbol vector set that can be used in FLM according to various embodiments.

TABLE 1

| Bit Data Input | represent a symbol vector set modulated with GIM | a symbol vector set modulated with FLM |
|---|---|---|
| 00000 | [0, 0] | [0, 0] |
| 00001 | [0, +1] | [0, +1] |
| 00010 | [0, −1] | [0, −1] |
| 00011 | [0, +3] | [0, +2] |
| 00100 | [0, −3] | [0, −2] |
| 00101 | [+1, 0] | [+1, 0] |
| 00110 | [−1, 0] | [−1, 0] |
| 00111 | [+3, 0] | [+2, 0] |
| 01000 | [−3, 0] | [−2, 0] |
| 01001 | [+1, +1] | [+1, +1] |
| 01010 | [+1, −1] | [+1, −1] |
| 01011 | [+1, +3] | [+1, +2] |
| 01100 | [+1, −3] | [+1, −2] |
| 01101 | [−1, +1] | [−1, +1] |
| 01110 | [−1, −1] | [−1, −1] |
| 01111 | [−1, +3] | [−1, +2] |
| 10000 | [−1, −3] | [−1, −2] |
| 10001 | [+3, +1] | [+2, +1] |
| 10010 | [+3, −1] | [+2, −1] |
| 10011 | [+3, +3] | [+2, +2] |
| 10111 | [+3, −3] | [+2, −2] |
| 11000 | [−3, +1] | [−2, +1] |
| 10001 | [−3, −1] | [−2, −1] |
| 10010 | [−3, +3] | [−2, +2] |
| 10011 | [−3, −3] | [−2, −2] |

In Table 1, a first column may represent input bit data, a second column may represent symbol vectors modulated with GIM from each bit data, and a third column may represent symbol vectors modulated with FLM from each bit data.

In Table 1, the second column may represent a symbol vector set modulated with GIM by using PAM. The second column may represent a symbol vector set when GIM is applied to a subcarrier group including subcarriers grouped in pair (G=2) and activate subcarriers of two subcarriers are modulated with 4-PAM. For example, a symbol vector [0, 0] corresponding to bit data 00000 may represent that both of the two subcarriers included in the subcarrier group are inactive. For another example, a symbol vector [0, +1] corresponding to bit data 00001 may represent that a first carrier of the two subcarriers included the subcarrier group is inactive, and a second subcarrier is active and is modulated to correspond to +1 of 4-PAM.

In Table 1, the third column may represent a symbol vector set modulated with FLM. The third column may represent a 2-dimensional symbol vector set generated in an ascending order power according to the process of FIG. 5A or FIG. 5B by using a 2×2 lattice generation matrix. For example, although $$\begin{pmatrix} 1 & 0 \\ 0 & 1 \end{pmatrix}$$

may be used as the 2×2 lattice generation matrix, without being limited thereto, various 2×2 matrixes having integer elements may be used as the lattice generation matrix.

In some embodiments, in order to represent symbol vectors modulated with FLM as shown in the third column of Table 3, one subcarrier group may include two subcarriers (G=3), and each subcarrier may be modulated by using PAM. For example, a symbol vector [0, 0] corresponding to bit data 00000 may represent that both of the two subcarriers included in the subcarrier group are inactive. For another example, a symbol vector [0, +2] corresponding to bit data 00011 may represent that a first carrier of the two subcarriers included the subcarrier group is inactive, and a second subcarrier is active and is modulated to correspond to +2 of any PAM.

In the second column of Table 1, the average energy $E_S$ of the symbol vectors included in the symbol vector set modulated with GIM may be $$\frac{0 \times 1 + 1 \times 4 + 2 \times 4 + 9 \times 4 + 10 \times 8 + 18 \times 4}{25} = \frac{200}{25} = 8$$

when using Equation (7), and the normalized minimum distance $D_{min}^2$ between symbol vectors may be ⅛=0.125 when using Equation (8).

In the third column of Table 1, the average energy $E_S$ of the symbol vectors included in the symbol vector set modulated with FLM may be $$\frac{0 \times 1 + 1 \times 4 + 2 \times 4 + 4 \times 4 + 5 \times 8 + 8 \times 4}{25} = \frac{100}{25} = 4$$

when using Equation (7), and the normalized minimum distance $D_{min}^2$ between symbol vectors may be ¼=0.25 when using Equation (8). The normalized minimum distance between the symbol vectors modulated with FLM may be greater than the normalized minimum distance between the symbol vectors modulated with GIM. Therefore, when a symbol is generated with FLM, a decreased error rate may be achieved at a signal-to-noise ratio (SNR) in comparison with a case of generating a symbol vector with GIM.

Figure 7:
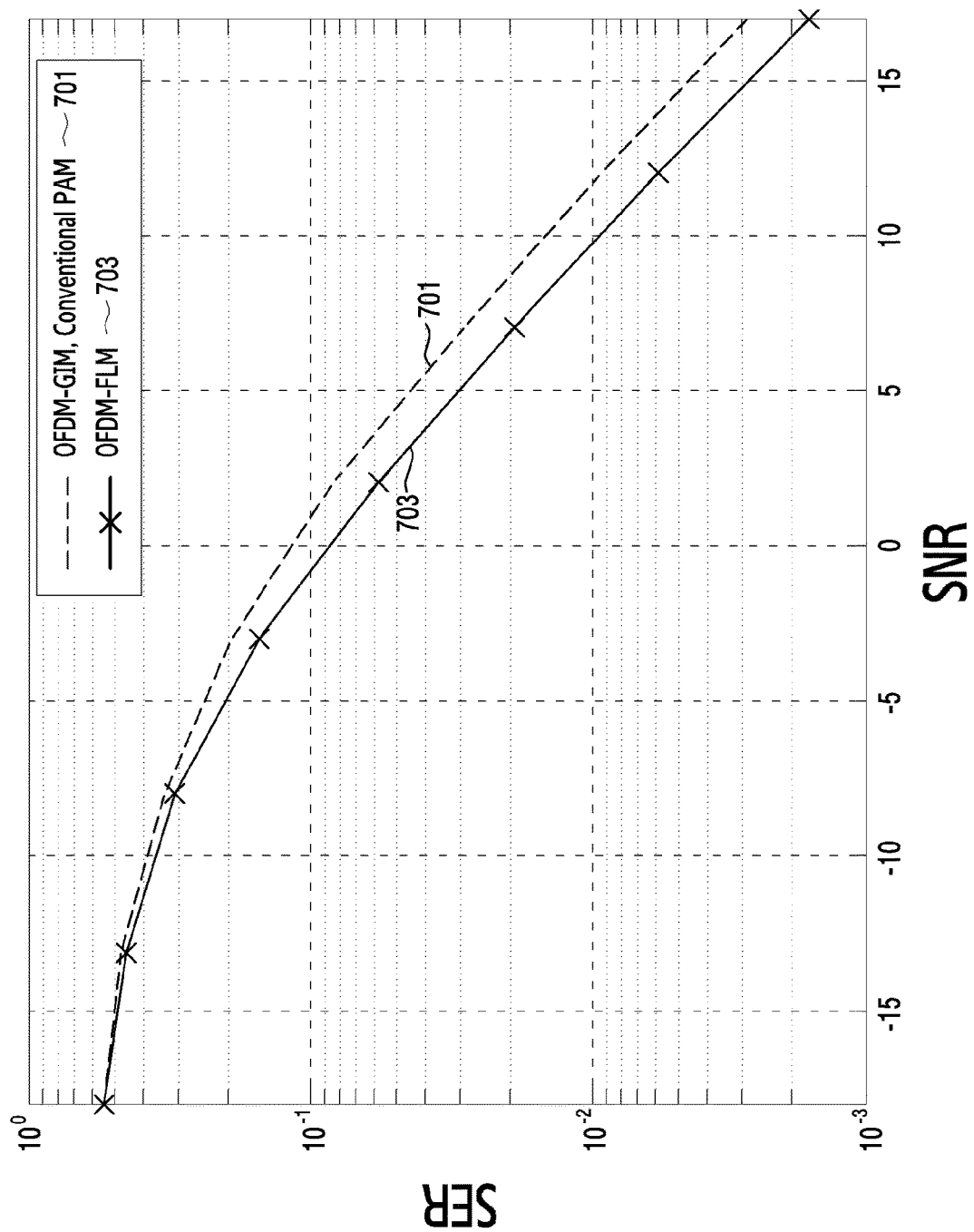
FIG. 7 illustrates a graph for representing performance in a frequency lattice modulation scheme according to some embodiments.

FIG. 7 illustrates a graph for representing performance in a frequency lattice modulation scheme according to some embodiments. The performance of the frequency lattice modulation scheme may include a symbol error rate (SER).

Referring to FIG. 7, a horizontal axis may represent a Signal-to-Noise Ratio (SNR). A graph 701 may represent an SER of a GIM scheme. A graph 703 may represent an SER of an FLM scheme. The graph 701 and the graph 703 illustrate an example of a case where one subcarrier group (or one symbol vector) includes four subcarriers (G=4), and each subcarrier is modulated based on 4-PAM. The graph 703 has a decreased error rate (e.g., an SER) in a high SNR area in comparison with the graph 701.

In some other embodiments, a 4×4 lattice generation matrix may be used to determine a 4-dimensional transmission symbol vector set for FLM. For example, a 4-dimensional Barnes Wall lattice may be used as the 4×4 lattice generation matrix for determining the 4-dimensional transmission symbol vector set. For example, the 4-dimensional Barnes Wall lattice may be given by Equation (9).

$$D_4 = \begin{pmatrix} 2 & 0 & 0 & 0 \\ 1 & 1 & 0 & 0 \\ 1 & 0 & 1 & 0 \\ 1 & 1 & 1 & 1 \end{pmatrix} \quad (9)$$

In Equation (9), D4 may denote a 4-dimensional Barnes Wall lattice. Basis vectors of D4 may be expressed by d1=(2, 0, 0, 0)$^T$, d2=(1, 1, 0, 0)$^T$, d3=(1, 0, 1, 0)$^T$, d4=(1, 1, 1, 1)$^T$. Since the process of FIG. 5A or FIG. 5B is performed by using D4 as the 4×4 lattice generation matrix, the 4-dimensional symbol vector set for FLM may be generated.

TABLE 2

| Bit Data Input | Subcarrier group corresponding to the 4-dimensional symbol vectors modulated with GLM | 4-dimensional Barnes Wall lattice as a lattice generation matrix, subcarrier group corresponding to the 4-dimensional symbol vectors modulated with FLM |
|---|---|---|
| 0000000 | [0, 0, 0, 0]$^T$ | [0, 0, 0, 0]$^T$ |
| 0000001 | [1, 0, 0, 0]$^T$ | [1, 1, 0, 0]$^T$ |
| 0000010 | [−1, 0, 0, 0]$^T$ | [1, −1, 0, 0]$^T$ |
| 0000011 | [0, 1, 0, 0]$^T$ | [−1, 1, 0, 0]$^T$ |
| 0000100 | [0, −1, 0, 0]$^T$ | [−1, −1, 0, 0]$^T$ |
| 0000101 | [0, 0, 1, 0]$^T$ | [1, 0, 1, 0]$^T$ |
| 0000110 | [0, 0, −1, 0]$^T$ | [1, 0, −1, 0]$^T$ |
| 0000111 | [0, 0, 0, 1]$^T$ | [−1, 0, 1, 0]$^T$ |
| 0001000 | [0, 0, 0, −1]$^T$ | [−1, 0, −1, 0]$^T$ |
| 0001001 | [1, 1, 0, 0]$^T$ | [1, 0, 0, 1]$^T$ |
| 0001010 | [1, −1, 0, 0]$^T$ | [1, 0, 0, −1]$^T$ |
| 0001011 | [−1, 1, 0, 0]$^T$ | [−1, 0, 0, 1]$^T$ |
| 0001100 | [−1, −1, 0, 0]$^T$ | [−1, 0, 0, −1]$^T$ |
| 0001101 | [1, 0, 1, 0]$^T$ | [0, 1, 1, 0]$^T$ |
| 0001110 | [1, 0, −1, 0]$^T$ | [0, 1, −1, 0]$^T$ |
| 0001111 | [−1, 0, 1, 0]$^T$ | [0, −1, 1, 0]$^T$ |
| 0010000 | [−1, 0, −1, 0]$^T$ | [0, −1, −1, 0]$^T$ |
| 0010001 | [1, 0, 0, 1]$^T$ | [0, 1, 0, 1]$^T$ |
| 0010010 | [1, 0, 0, −1]$^T$ | [0, 1, 0, −1]$^T$ |
| 0010011 | [−1, 0, 0, 1]$^T$ | [0, −1, 0, 1]$^T$ |
| 0010100 | [−1, 0, 0, −1]$^T$ | [0, −1, 0, −1]$^T$ |
| 0010101 | [0, 1, 1, 0]$^T$ | [0, 0, 1, 1]$^T$ |
| 0010110 | [0, 1, −1, 0]$^T$ | [0, 0, 1, −1]$^T$ |
| 0010111 | [0, −1, 1, 0]$^T$ | [0, 0, −1, 1]$^T$ |
| 0011000 | [0, −1, −1, 0]$^T$ | [0, 0, −1, −1]$^T$ |
| 0011001 | [0, 1, 0, 1]$^T$ | [1, 1, 1, 1]$^T$ |
| 0011010 | [0, 1, 0, −1]$^T$ | [1, 1, 1, −1]$^T$ |

TABLE 2-continued

| Bit Data Input | Subcarrier group corresponding to the 4-dimensional symbol vectors modulated with GLM | 4-dimensional Barnes Wall lattice as a lattice generation matrix, subcarrier group corresponding to the 4-dimensional symbol vectors modulated with FLM |
|---|---|---|
| 0011011 | $[0, -1, 0, 1]^T$ | $[1, 1, -1, 1]^T$ |
| 0011100 | $[0, -1, 0, -1]^T$ | $[1, -1, 1, 1]^T$ |
| 0011101 | $[0, 0, 1, 1]^T$ | $[-1, 1, 1, 1]^T$ |
| 0011110 | $[0, 0, 1, -1]^T$ | $[1, 1, -1, -1]^T$ |
| 0011111 | $[0, 0, -1, 1]^T$ | $[1, -1, 1, -1]^T$ |
| 0100000 | $[0, 0, -1, -1]^T$ | $[1, -1, -1, 1]^T$ |
| 0100001 | $[1, 1, 1, 0]^T$ | $[-1, 1, 1, -1]^T$ |
| 0100010 | $[1, 1, -1, 0]^T$ | $[-1, 1, -1, 1]^T$ |
| 0100011 | $[1, -1, 1, 0]^T$ | $[-1, -1, 1, 1]^T$ |
| 0100100 | $[-1, 1, 1, 0]^T$ | $[1, -1, -1, -1]^T$ |
| 0100101 | $[1, -1, -1, 0]^T$ | $[-1, 1, -1, -1]^T$ |
| 0100110 | $[-1, 1, -1, 0]^T$ | $[-1, -1, 1, -1]^T$ |
| 0100111 | $[-1, -1, 1, 0]^T$ | $[-1, -1, -1, 1]^T$ |
| 0101000 | $[-1, -1, -1, 0]^T$ | $[1, -1, -1, -1]^T$ |
| 0101001 | $[1, 1, 0, 1]^T$ | $[2, 0, 0, 0]^T$ |
| 0101010 | $[1, 1, 0, -1]^T$ | $[-2, 0, 0, 0]^T$ |
| 0101011 | $[1, -1, 0, 1]^T$ | $[0, 2, 0, 0]^T$ |
| 0101100 | $[-1, 1, 0, 1]^T$ | $[0, -2, 0, 0]^T$ |
| 0101101 | $[1, -1, 0, -1]^T$ | $[0, 0, 2, 0]^T$ |
| 0101110 | $[-1, 1, 0, -1]^T$ | $[0, 0, -2, 0]^T$ |
| 0101111 | $[-1, -1, 0, 1]^T$ | $[0, 0, 0, 2]^T$ |
| 0110000 | $[-1, -1, 0, -1]^T$ | $[0, 0, 0, -2]^T$ |
| 0110001 | $[1, 0, 1, 1]^T$ | $[2, 1, 1, 0]^T$ |
| 0110010 | $[1, 0, 1, -1]^T$ | $[-2, 1, 1, 0]^T$ |
| 0110011 | $[1, 0, -1, 1]^T$ | $[2, 1, 0, 1]^T$ |
| 0110100 | $[-1, 0, 1, 1]^T$ | $[-2, 1, 0, 1]^T$ |
| 0110101 | $[1, 0, -1, -1]^T$ | $[2, 0, 1, 1]^T$ |
| 0110110 | $[-1, 0, 1, -1]^T$ | $[-2, 0, 1, 1]^T$ |
| 0110111 | $[-1, 0, -1, 1]^T$ | $[1, 2, 1, 0]^T$ |
| 0111000 | $[-1, 0, -1, -1]^T$ | $[1, -2, 1, 0]^T$ |
| 0111001 | $[0, 1, 1, 1]^T$ | $[1, 2, 0, 1]^T$ |
| 0111010 | $[0, 1, 1, -1]^T$ | $[1, -2, 0, 1]^T$ |
| 0111011 | $[0, 1, -1, 1]^T$ | $[0, 2, 1, 1]^T$ |
| 0111100 | $[0, -1, 1, 1]^T$ | $[0, -2, 1, 1]^T$ |
| 0111101 | $[0, 1, -1, -1]^T$ | $[1, 1, 2, 0]^T$ |
| 0111110 | $[0, -1, 1, -1]^T$ | $[1, 1, -2, 0]^T$ |
| 0111111 | $[0, -1, -1, 1]^T$ | $[1, 0, 2, 1]^T$ |
| 1000000 | $[0, -1, -1, -1]^T$ | $[1, 0, -2, 1]^T$ |
| 1000001 | $[1, 1, 1, 1]^T$ | $[0, 1, 2, 1]^T$ |
| 1000010 | $[1, 1, 1, -1]^T$ | $[0, 1, -2, 1]^T$ |
| 1000011 | $[1, 1, -1, 1]^T$ | $[1, 1, 0, 2]^T$ |
| 1000100 | $[1, -1, 1, 1]^T$ | $[1, 1, 0, -2]^T$ |
| 1000101 | $[-1, 1, 1, 1]^T$ | $[1, 0, 1, 2]^T$ |
| 1000110 | $[1, 1, 1, -1]^T$ | $[1, 0, 1, -2]^T$ |
| 1000111 | $[1, -1, 1, -1]^T$ | $[1, 0, -1, -2]^T$ |
| 1001000 | $[1, -1, -1, 1]^T$ | $[0, 1, 1, 2]^T$ |
| 1001001 | $[-1, 1, 1, -1]^T$ | $[2, -1, -1, 0]^T$ |
| 1001010 | $[-1, 1, -1, 1]^T$ | $[-2, -1, -1, 0]^T$ |
| 1001011 | $[-1, -1, 1, 1]^T$ | $[0, 2, -1, -1]^T$ |
| 1001100 | $[1, -1, -1, -1]^T$ | $[0, -2, -1, -1]^T$ |
| 1001101 | $[-1, 1, -1, -1]^T$ | $[-1, 0, 2, -1]^T$ |
| 1001110 | $[-1, -1, 1, -1]^T$ | $[-1, 0, -2, -1]^T$ |
| 1001111 | $[-1, -1, -1, 1]^T$ | $[-1, -1, 0, 2]^T$ |
| 1010000 | $[1, -1, -1, -1]^T$ | $[-1, -1, 0, -2]^T$ |

In Table 2, a first column may represent input bit data, a second column may represent 4-dimensional symbol vectors modulated with GIM from each bit data, and a third column may represent 4-dimensional symbol vectors modulated with FLM from each bit data.

For example, in the second column of Table 2, one subcarrier group corresponding to the 4-dimensional symbol vectors modulated with GIM may include four subcarriers (G=4), and each subcarrier may be modulated using 2-PAM. For example, a symbol vector [1, 0, 0, 0] corresponding to bit data 0000001 may represent that a first subcarrier of the four subcarriers included in the subcarrier group is active and is modulated to correspond to +1 of 2-PAM, and a second subcarrier to a fourth subcarrier are inactive.

In some embodiments, one subcarrier group corresponding to the 4-dimensional symbol vectors (a third column of Table 2) modulated with FLM may include four subcarriers (G=4), and each subcarrier may be modulated using 4-PAM. For example, an FLM 4-dimensional symbol vector [2, 0, 0, 0] corresponding to bit data 0101001 may represent that a first subcarrier among four subcarriers included in the subcarrier group is active and is modulated to correspond to +2 of 4-PAM, and a second subcarrier to a fourth subcarrier are inactive.

In some other embodiments, one subcarrier group corresponding to the 4-dimensional symbol vectors (the third column of Table 2) modulated with FLM may include two subcarriers (G=2), and each subcarrier may be modulated using QAM. For example, two subcarriers may be grouped into one subcarrier group (G=2), and modulation may be applied to an in-phase (or real part) and quadrature-phase (or imaginary part) of each subcarrier. For example, an FLM 4-dimensional symbol vector [1, 0, 1, 0] corresponding to bit data 0000101 may represent that an in-phase (or real part) of a first subcarrier is active, a quadrature-part (or imaginary part) of the first carrier is inactive, an in-phase (or real part) of a second subcarrier is inactive, and a quadrature-phase (or imaginary part) of the second subcarrier is inactive. When the FLM modulation is performed in this manner, one subcarrier group consisting of a combination of G subcarriers may correspond to a 2G-dimensional symbol vector (n=2G).

In the second column of Table 2, the average energy $E_S$ of the symbol vectors included in the 4-dimensional symbol vector set modulated with GIM may be $$\frac{0 \times 1 + 1 \times 8 + 2 \times 24 + 3 \times 32 + 4 \times 16}{81} = \frac{216}{81} = 2.667$$

when using Equation (7), and the normalized minimum distance $D_{min}^2$ between symbol vectors may be $$\frac{1}{2.667} = 0.375$$

when using Equation (8).

In the third column of Table 2, the average energy $E_S$ of the symbol vectors included in the 4-dimensional symbol vector set modulated with FLM may be $$\frac{0 \times 1 + 2 \times 24 + 4 \times 24 + 6 \times 32}{81} = \frac{336}{81} = 4.15$$

when using Equation (7), and the normalized minimum distance $D_{min}^2$ between symbol vector may be $$\frac{2}{4.15} = 0.482$$

when using Equation (8). The normalized minimum distance between the symbol vectors modulated with FLM may be greater than the normalized minimum distance between the symbol vectors modulated with GIM. Therefore, when a symbol is generated with FLM, a decreased error rate may be achieved at a signal-to-noise ratio (SNR) in comparison with a case of generating a symbol vector with GIM.

In various embodiments, a 2-dimensional Barnes Wall lattice may be used as a 2×2 lattice generation matrix for determining a 2-dimensional transmission symbol vector set. A 4-dimensional Barnes Wall lattice may be used as a 4×4 lattice generation matrix for generating a 4-dimensional symbol vector set. An 8-dimensional Barnes Wall lattice may be used as an 8×8 lattice generation matrix for generating a 8-dimensional symbol vector set. A $2^N$-dimensional Barnes Wall lattice may be used as a $2^N \times 2^N$ lattice generation matrix for generating a $2^N$-dimensional symbol vector. The Barnes Wall lattice may be a matrix for maximizing a normalized minimum distance $D_{min}^2$ between $2^N$-dimensional symbol vectors among the $2^N \times 2^N$ lattice generation matrixes for generating the $2^N$-dimensional symbol vectors. However, without being limited thereto, an n×n lattice generation matrix may be randomly determined.

Figure 8A:
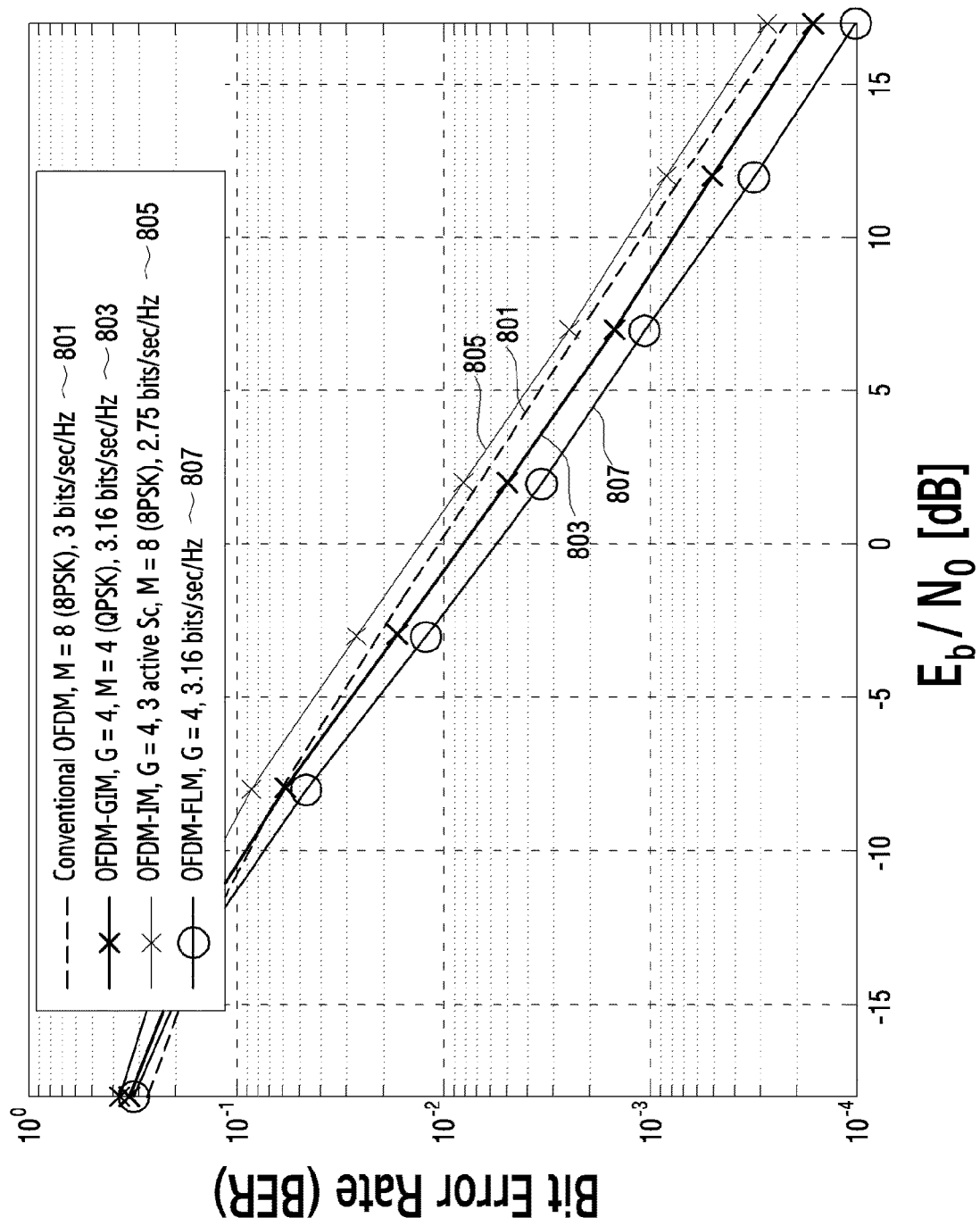
FIG. 8A illustrates a graph for representing performance in a frequency lattice modulation scheme according to some other embodiments.

FIG. 8A illustrates a graph for representing performance in a frequency lattice modulation scheme according to some other embodiments. The performance of the frequency lattice modulation scheme may include a bit error rate (BER).

Referring to FIG. 8A, a horizontal axis may represent a normalized SNR. A graph 801 may represent a BER of an OFDM scheme. A graph 803 may represent a BER of a GIM scheme. A group 805 may represent a BER of an IM scheme. A group 807 may represent a BER of an FLM scheme. $E_b$ of the horizontal axis may represent energy per bit, and $N_o$ may represent noise power.

The graphs 801, 803, 805, and 807 illustrate a case where the total number of subcarriers is 64, one subcarrier group is configured for four subcarriers, and the total number of subcarriers groups is 16 ($N_{SC}$=64, G=4, $N_G$=16). In the graphs 803, 805, and 807, since each of four subcarriers included in one subcarrier group may represent in-phase information and quadrature-phase information, one subcarrier group may represent an 8-dimensional symbol vector (n=2G).

Specifically, the graph 801 may represent a BER of a modulation scheme in which each subcarrier is modulated with OFDM by using 8PSK, and frequency efficiency is 3 bits/sec/Hz. The graph 803 may represent a BER of a modulation scheme in which one subcarrier group includes four subcarriers (G=4), each subcarrier is modulated with OFDM-GIM by using QPSK, and frequency efficiency is 3.16 bits/sec/Hz. The graph 805 may represent a BER of a modulation scheme in which modulation is performed with OFDM-IM by fixing the number of active subcarriers to 3 (K=3) among the four subcarriers (G=4) included in one subcarrier group, and frequency efficiency is 2.75 bits/sec/Hz. The graph 807 may represent a BER of a modulation scheme in which one subcarrier group includes four subcarriers (G=4), each subcarrier group is modulated with OFDM-FLM, and frequency efficiency is 3.16 bits/sec/Hz.

Referring to a high SNR area of FIG. 8A, an OFDM-FLM scheme may obtain a gain of about 3 dB in comparison with an OFDM scheme. Alternatively, the OFDM-FLM scheme may decrease an error rate in comparison with other modulation schemes (e.g., OFDM, OFDM-IM, OFDM-GIM).

Figure 8B:
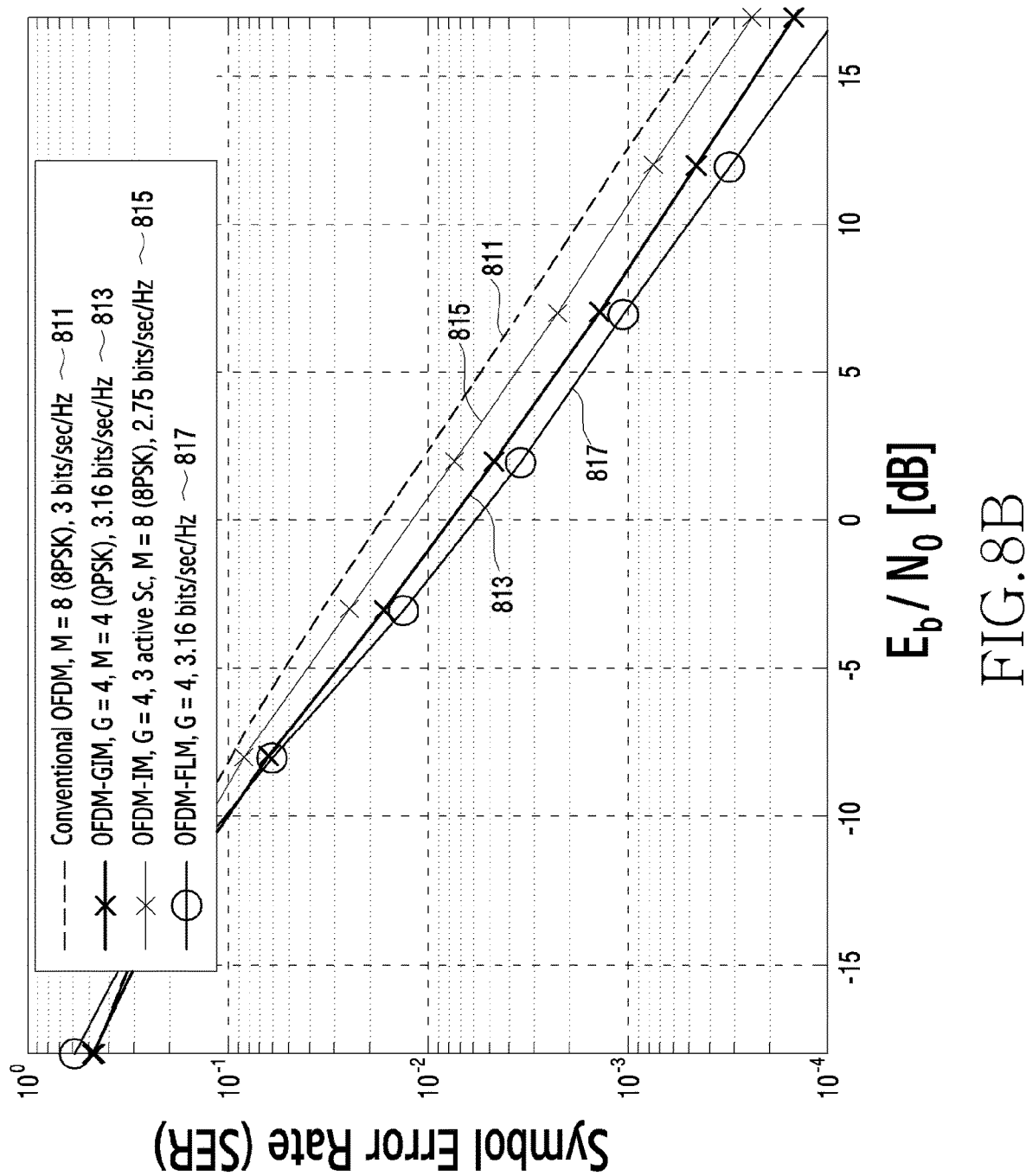
FIG. 8B illustrates another graph for representing performance in a frequency lattice modulation scheme according to some other embodiments.

FIG. 8B illustrates another graph for representing performance in a frequency lattice modulation scheme according to some other embodiments. The performance of the frequency lattice modulation scheme may include a symbol error rate (SER).

Referring to FIG. 8B, a horizontal axis may represent a normalized SNR. A graph 811 may represent an SER of an OFDM scheme. A graph 813 may represent an SER of a GIM scheme. A graph 815 may represent an SER of an IM scheme. A graph 817 may represent an SER of an FLM scheme.

Detailed descriptions on the graphs 811, 813, 815, and 817 of FIG. 8B may respectively correspond to those of the graphs 801, 803, 805, and 807 of FIG. 8A.

Referring to a high SNR area of FIG. 8B, an OFDM-FLM scheme may obtain a gain of about 5 dB in comparison with an OFDM scheme. Alternatively, the OFDM-FLM scheme may decrease an SER in comparison with other modulation schemes (e.g., OFDM, OFDM-IM, OFDM-GIM).

Figure 9A:
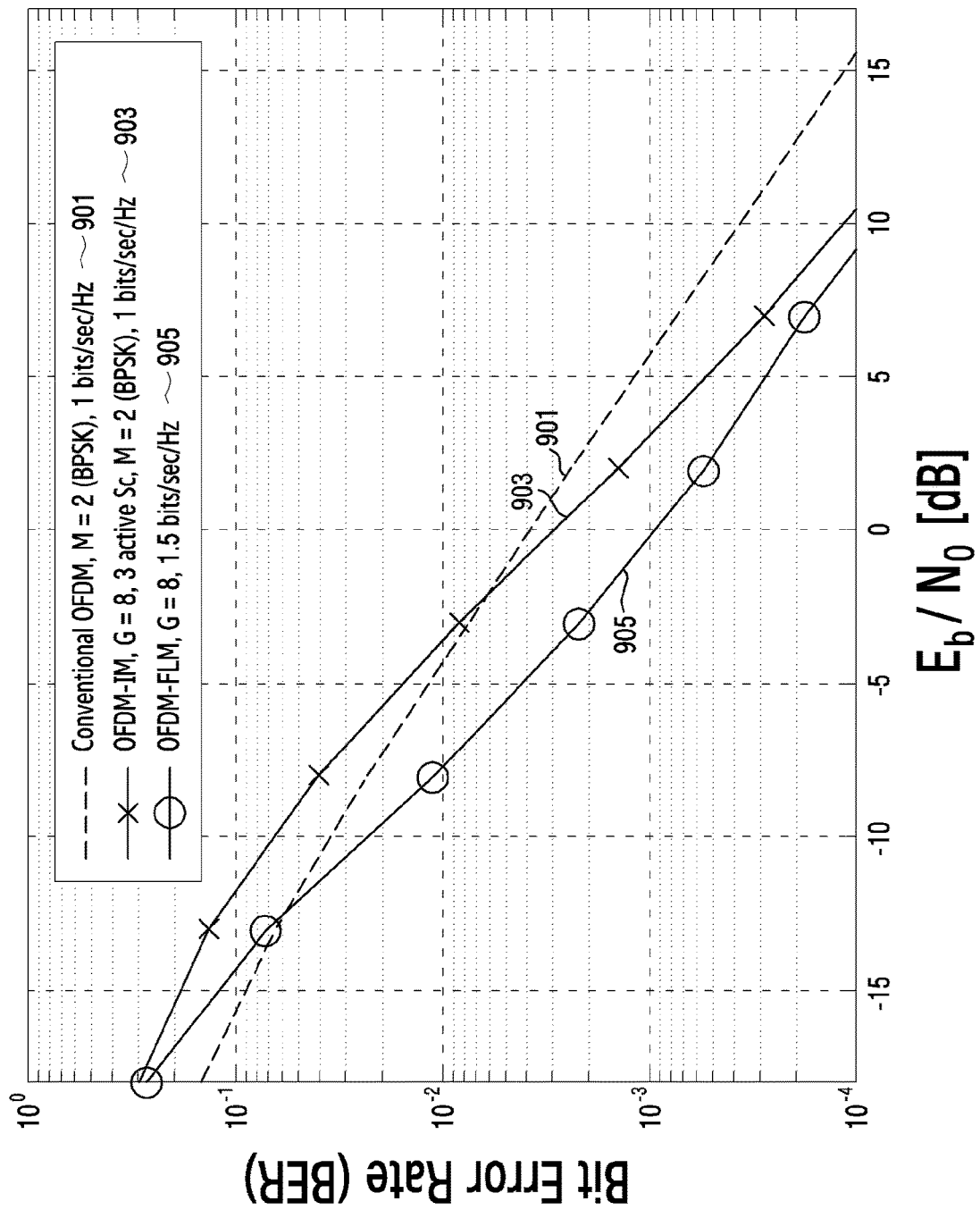
FIG. 9A illustrates a graph for representing performance in a frequency lattice modulation scheme according to some other embodiments.

FIG. 9A illustrates a graph for representing performance in a frequency lattice modulation scheme according to some other embodiments. The performance of the frequency lattice modulation scheme may include a BER.

Referring to FIG. 9A, a horizontal axis may represent a normalized SNR. A graph 901 may represent a BER of an OFDM scheme. A graph 903 may represent a BER of an IM scheme. A graph 905 may represent a BER of an FLM scheme. $E_b$ of the horizontal axis may represent energy per bit, and $N_o$ may represent noise power.

The graphs 901, 903, and 905 illustrate a case where the total number of subcarriers is 64, one subcarrier group is configured for 8 subcarriers, and the total number of subcarriers groups is 8 ($N_{SC}$=64, G=8, $N_G$=8). In the graphs 903 and 905, since each of 8 subcarriers included in one subcarrier group may represent in-phase information and quadrature-phase information, one subcarrier group may represent a 16-dimensional symbol vector (n=2G).

Specifically, the graph 901 may represent a BER of a modulation scheme in which each subcarrier is modulated with OFDM by using BPSK, and frequency efficiency is 1 bits/sec/Hz. The graph 903 may represent a BER of a modulation scheme in which modulation is performed with OFDM-IM by fixing the number of active subcarriers to 3 (K=3) among the 8 subcarriers (G=8) included in one subcarrier group, the active subcarriers are modulated using BPSK, and frequency efficiency is 1 bits/sec/Hz. The graph 905 may represent a BER of a modulation scheme in which one subcarrier group includes 8 subcarriers (G=8), each subcarrier group is modulated with OFDM-FLM, and frequency efficiency is 1.5 bits/sec/Hz.

Referring to a high SNR area of FIG. 9A, an OFDM-FLM scheme may obtain a gain of about 6 dB in comparison with an OFDM scheme. Alternatively, the OFDM-FLM scheme may decrease a BER in comparison with other modulation schemes (e.g., OFDM, OFDM-IM, OFDM-GIM).

Figure 9B:
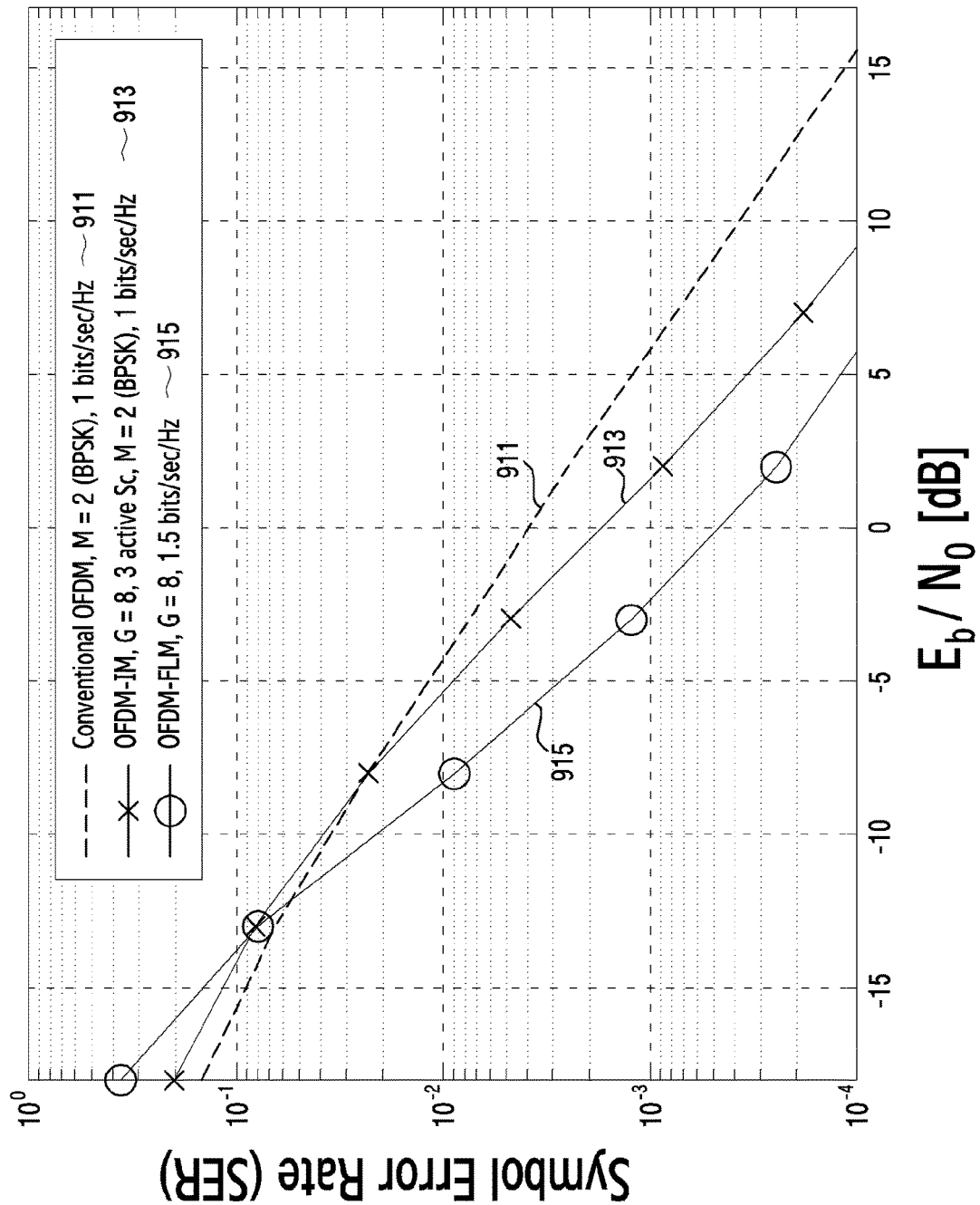
FIG. 9B illustrates another graph for representing performance in a frequency lattice modulation scheme according to some other embodiments.

FIG. 9B illustrates another graph for representing performance in a frequency lattice modulation scheme according to some other embodiments. The performance of the frequency lattice modulation scheme may include an SER.

Referring to FIG. 9B, a horizontal axis may represent a normalized SNR. A graph 911 may represent an SER of an OFDM scheme. A graph 913 may represent an SER of an IM scheme. A graph 915 may represent an SER of an FLM scheme.

Detailed descriptions on the graphs 911, 913, and 915 of FIG. 9B may respectively correspond to those of the graphs 901, 903, and 905 of FIG. 9A.

Referring to a high SNR area of FIG. 9B, an OFDM-FLM scheme may obtain a gain of about 9.5 dB in comparison with an OFDM scheme. Alternatively, the OFDM-FLM scheme may decrease an SER in comparison with other modulation schemes (e.g., OFDM, OFDM-IM, OFDM-GIM).

Figure 10:
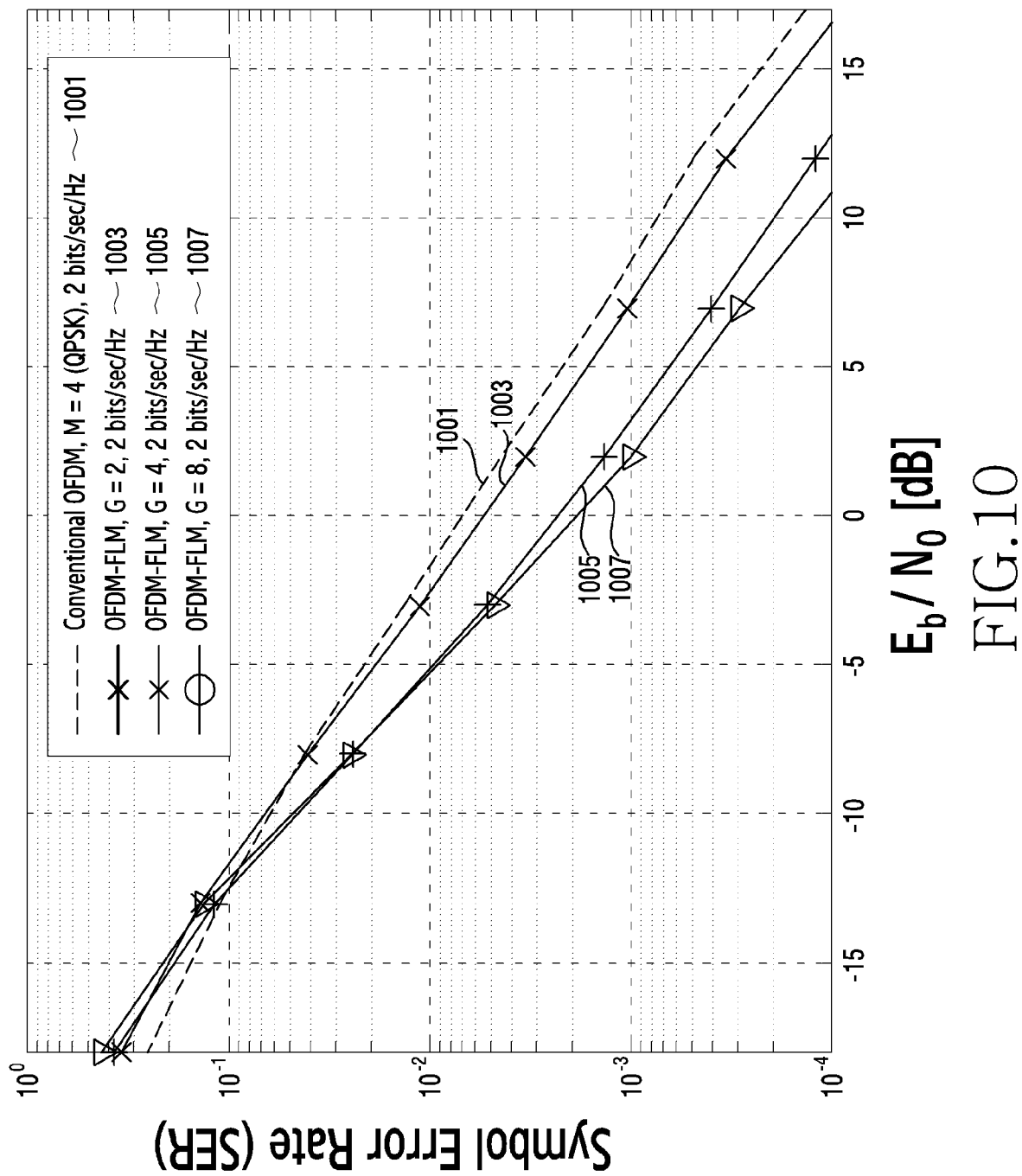
FIG. 10 illustrates a graph for representing performance in a frequency lattice modulation scheme according to some other embodiments.

FIG. 10 illustrates a graph for representing performance in a frequency lattice modulation scheme according to some other embodiments. The performance of the frequency lattice modulation scheme may include an SER. An example of an SER may be shown in FIG. 10 according to a subcarrier group size in a frequency lattice modulation scheme. The group size may imply the number G of subcarriers included in one subcarrier group.

Referring to FIG. 10, a horizontal axis may represent a normalized SNR. A graph 1001 may represent an SER of an OFDM scheme using QPSK. A graph 1003 may represent an SER of an FLM scheme when a group size is 2 (G=2). A graph 1005 may represent an SER of an FLM scheme when a group size is 4 (G=4). A graph 1007 may represent in SER of an FLM scheme when a group size of 8 (G=8). The graphs 1001, 1003, 1005, and 1007 may represent modulation schemes in which frequency efficiency is fixed to 2 bits/sec/Hz.

In FIG. 10, the greater the group size G, the lower the SER at the same SNR.

Figure 11:
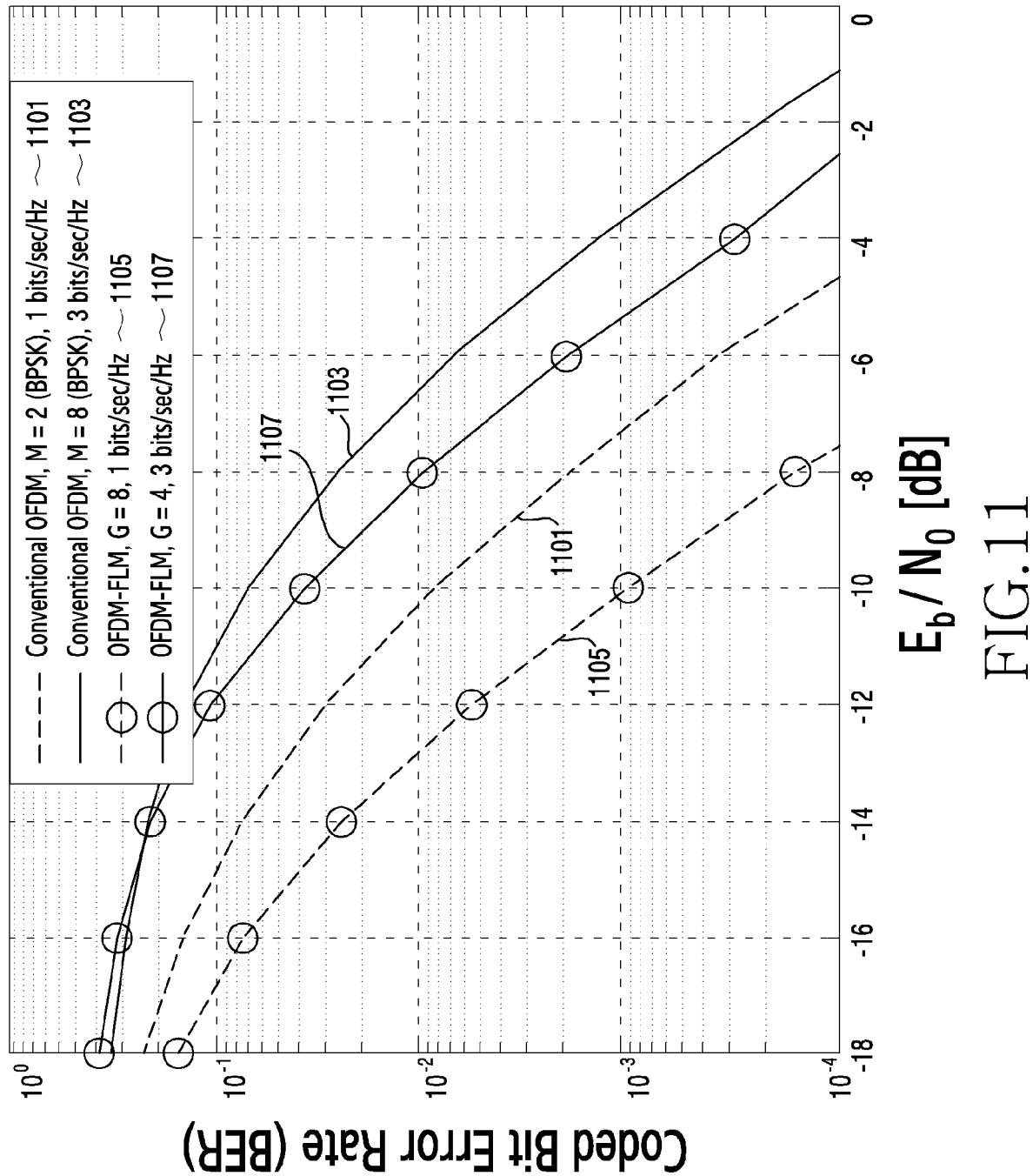
FIG. 11 illustrates a graph for representing performance in a frequency lattice modulation scheme according to some other embodiments.

FIG. 11 illustrates a graph for representing performance in a frequency lattice modulation scheme according to some other embodiments. The performance of the frequency lattice modulation scheme may include a BER.

Referring to FIG. 11, a horizontal axis may represent a normalized SNR. A graph 1101 may represent a BER of an OFDM scheme using BPSK. A graph 1005 may represent a BER of an FLM scheme when a group size is 8 (G=8). In the graph 1101 and the graph 1105, frequency efficiency may be fixed to 1 bit/sec/Hz. A BER of an FLM scheme (i.e., the graph 1105) with frequency efficiency of 1 bit/sec/Hz may be decreased in comparison with a BER of an OFDM scheme (i.e., the graph 1101) with the same frequency efficiency of 1 bit/sec/Hz.

A graph 1103 may represent a BER of an OFDM scheme using 8PSK. A graph 1107 may represent a BER of an FLM scheme when a group size is 4 (G=4). In the graph 1103 and the graph 1107, frequency efficiency may be fixed to 3 bit/sec/Hz. A BER of an FLM scheme (i.e., the graph 1107) with frequency efficiency of 3 bit/sec/Hz may be decreased in comparison with a BER of an OFDM scheme (i.e., the graph 1103) with the same frequency efficiency of 3 bit/sec/Hz.

Figure 12:
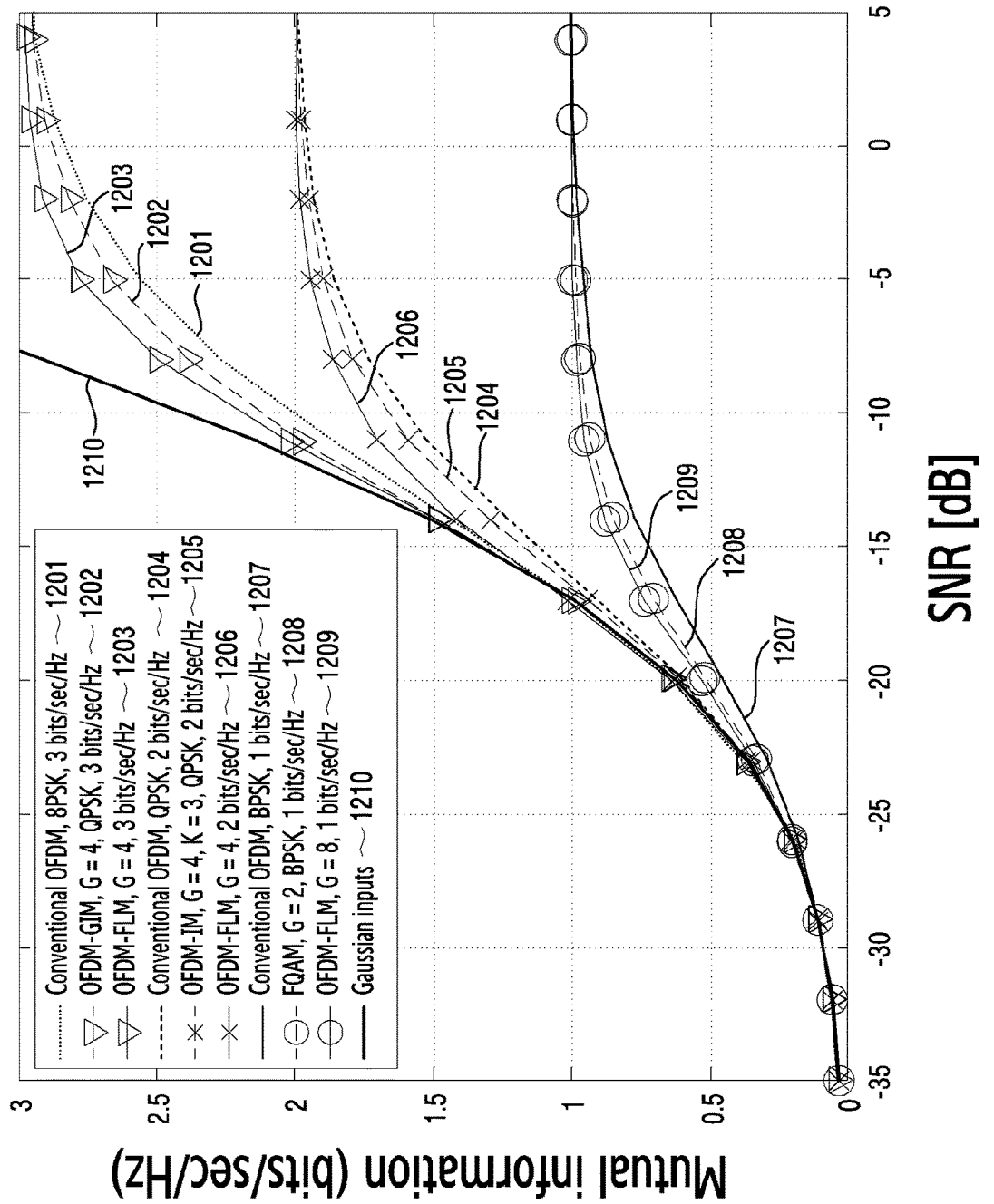
FIG. 12 illustrates a graph for representing performance in a frequency lattice modulation scheme according to some other embodiments.

FIG. 12 illustrates a graph for representing performance in a frequency lattice modulation scheme according to some other embodiments. The performance of the frequency lattice modulation scheme may include mutual information (MI). In FIG. 12, MI depending on frequency efficiency may be illustrated for a frequency modulation scheme.

Referring to FIG. 12, a horizontal axis may represent an SNR. Graphs 1201 to 1210 may represent MI depending on each modulation scheme. A MI value may be related to the maximum number of bits that can be sent for one subcarrier.

At a high SNR, the MI value may be close to frequency efficiency. At a low SNR, the MI value may be decreased due to noise effect.

In the graphs 1201 to 1203 with frequency efficiency of 3 bits/sec/Hz, the MI value may be close to 3 bits/sec/Hz in a high SNR area. In the graphs 1201 to 1203 with the same frequency efficiency (i.e., 3 bits/sec/Hz), an MI value of an FLM scheme (i.e., the graph 1203) may be greatest.

In the graphs 1204 to 1206 with frequency efficiency of 2 bits/sec/Hz, the MI value may be close to 2 bits/sec/Hz in a high SNR area. In the graphs 1204 to 1206 with the same frequency efficiency (i.e., 2 bits/sec/Hz), an MI value of an FLM scheme (i.e., the graph 1206) may be greatest.

In the graphs 1207 to 1209 with frequency efficiency of 1 bits/sec/Hz, the MI value may be close to 1 bits/sec/Hz in a high SNR area. In the graphs 1207 to 12096 with the same frequency efficiency (i.e., 1 bits/sec/Hz), an MI value of an FLM scheme (i.e., the graph 1209) may be greatest.

Accordingly, among the several modulation schemes of FIG. 12, the FLM modulation scheme may be used to transmit more information per subcarrier in comparison with other modulation scheme (e.g., OFDM, OFDM-IM, OFDM-GIM) in low SNR and middle SNR areas.

Figure 13:
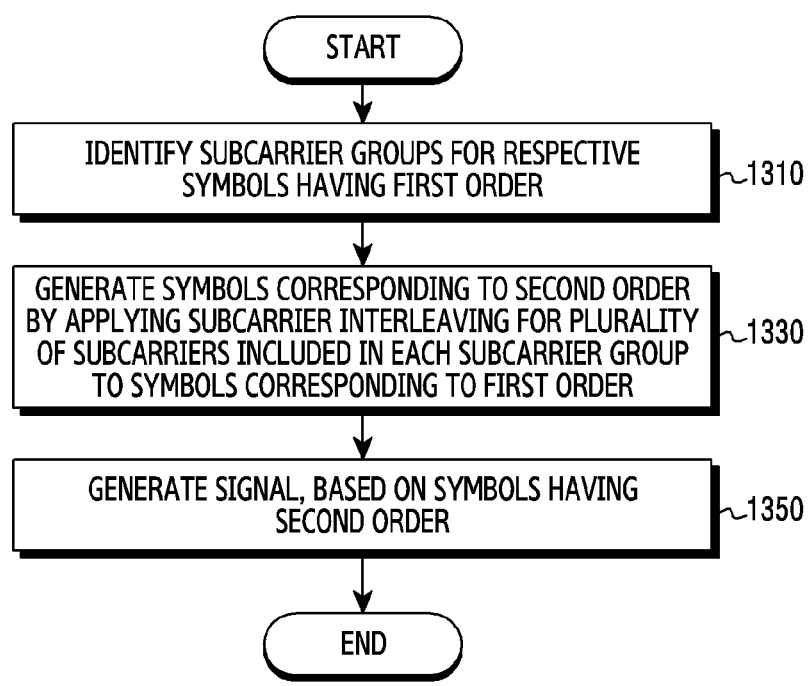
FIG. 13 illustrates an operational flow of a transmission device for interleaving according to various embodiments.
Figure 14:
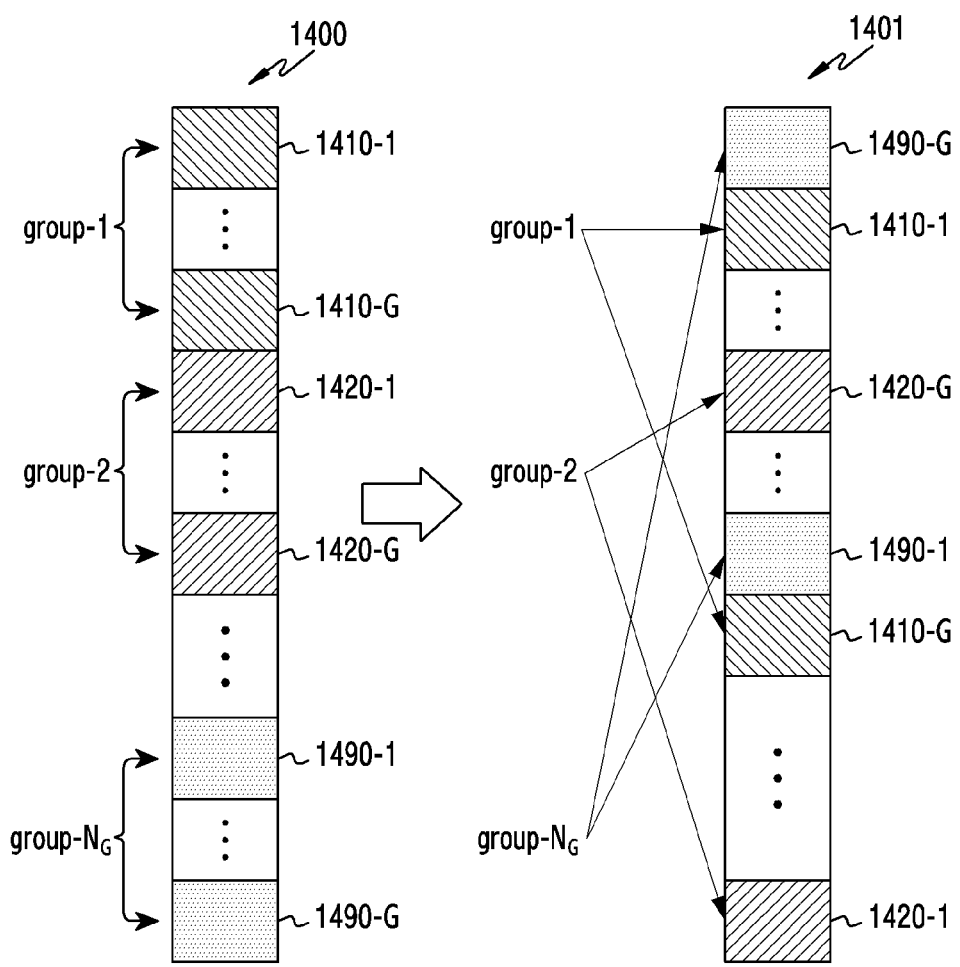
FIG. 14 illustrates an example of a concept for indicating an interleaving operation in a transmission device according to various embodiments.

FIG. 13 illustrates an operational flow of the transmission device 110 for interleaving according to various embodiments. The processor 111 of FIG. 1 may perform interleaving according to various embodiments. Although it is described hereinafter that the processor 111 performs interleaving, the disclosure is not limited thereto. That is, the interleaving according to various embodiments may be performed by the subcarrier interleaving unit 350 of FIG. 3. Operations for interleaving are described with reference to FIG. 14. FIG. 14 illustrates an example of a concept for indicating an interleaving operation in a transmission device according to various embodiments.

Referring to FIG. 13 and FIG. 14, in operation 1310, the processor 111 may identify subcarriers or subcarrier groups for each of symbols corresponding to a first order. Referring to FIG. 14, symbols corresponding to the first order may constitute a sequence 1400. That is, the symbols included in the sequence 1400 may correspond to the first order. The sequence 1400 may imply a sequence of a symbol vector-1 to a symbol-vector-$N_G$. The symbol vector-1 may correspond to a subcarrier group-1, and the symbol vector-$N_G$ may correspond to a subcarrier group-$N_G$. The subcarrier group-1 may include G subcarriers from a subcarrier 1410-1 to a subcarrier 1410-G. The subcarrier group-$N_G$ may include G subcarriers from a subcarrier 1490-1 to a subcarrier 1490-G. However, without being limited thereto, each reference numeral may imply a subcarrier, and may imply a symbol or digital data corresponding to a subcarrier.

The processor 111 may identify a subcarrier group-1 to subcarrier group-$N_G$ corresponding to a symbol vector-1 to symbol vector-$N_G$ received through the path 340 of FIG. 3, and may identify subcarriers (e.g., the subcarrier 1410-1 to the subcarrier 1410-G) included in each subcarrier group (e.g., the subcarrier group-1).

In operation 1330, the processor 111 may perform subcarrier interleaving on a plurality of subcarriers (e.g., the subcarrier 1410-1 to the subcarrier 1490-G) included respectively in the subcarrier groups (e.g., the subcarrier group-1 to the subcarrier group-$N_G$). As shown in FIG. 14, the processor 111 may perform subcarrier interleaving so that the plurality of subcarriers (e.g., the subcarrier 1410-1 to the subcarrier 1490-G) included in the plurality of subcarrier groups (e.g., the subcarrier group-1 to the subcarrier group-$N_G$) are deployed randomly from each other. The processor 111 may generate a sequence 1401 of symbols corresponding to a second order by performing subcarrier interleaving on the sequence 1400 of symbols corresponding to the first order.

In operation 1350, the processor 111 may generate a signal on the basis of the sequence 1401 of the symbols corresponding to the second order. The processor 111 may transmit the generated signal through an antenna.

Figure 15:
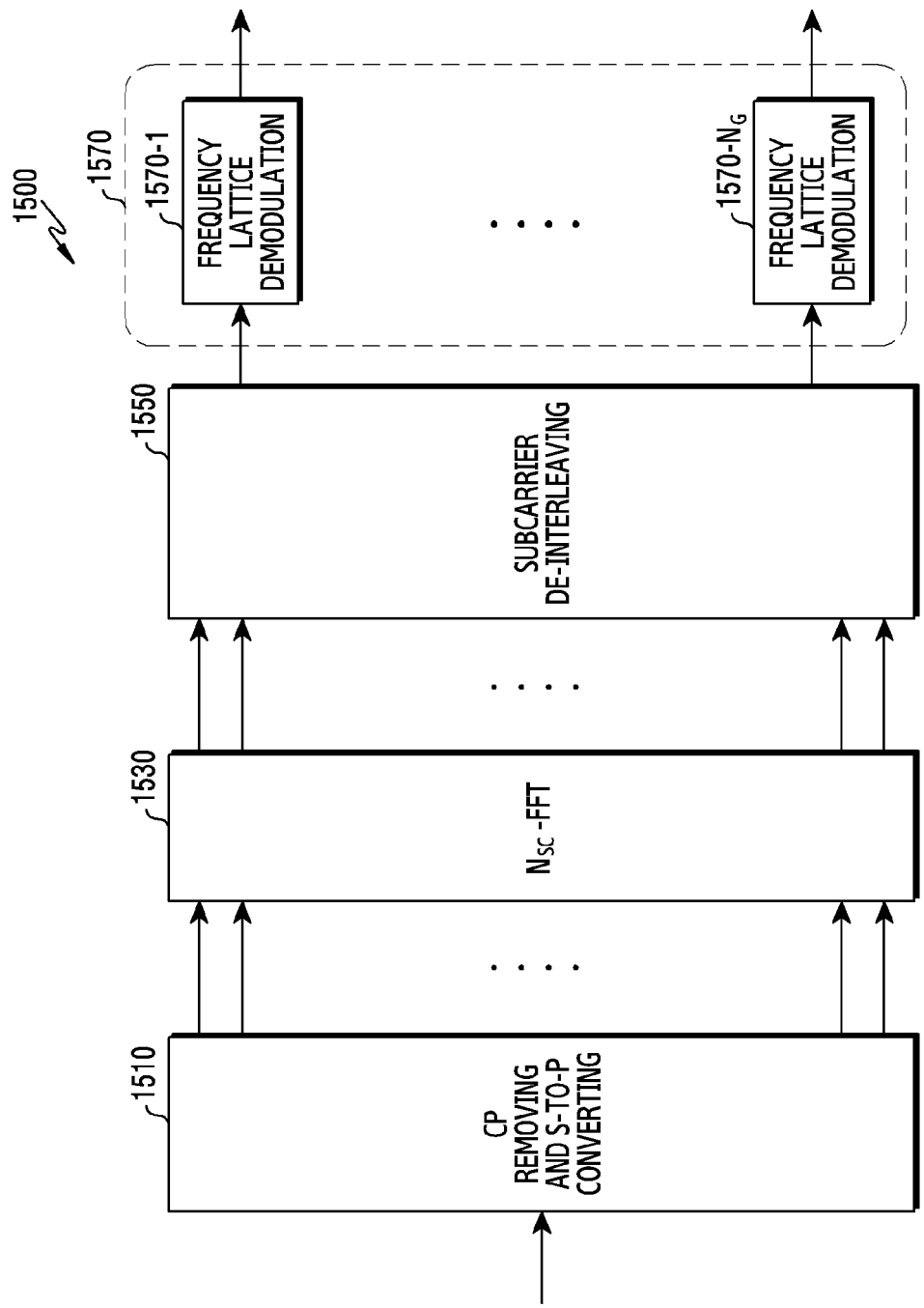
FIG. 15 illustrates an example of a functional structure of a reception device according to various embodiments.

FIG. 15 illustrates an example of a functional structure of a reception device according to various embodiments.

Referring to FIG. 15, a functional structure of a reception device 1500 (e.g., the reception device 120) may include a cyclic prefix (CP) removing and serial-to-parallel (S-to-P) converting unit 1510, an $N_{SC}$ size FFT applying unit 1530, a subcarrier de-interleaving unit 1550, and a frequency lattice demodulation unit 1570.

The CP removing and S-to-P converting unit 1510 may remove a CP from a received signal, and may perform S-to-P conversion on a symbol basis. The CP removing and S-to-P converting unit 1510 may transmit $N_{sc}$ symbols subjected to S-to-P conversion to the $N_{SC}$ size FFT applying unit 1530.

The $N_{SC}$ size FFT applying unit 1530 may apply fast fourier transform (FFT) on each of $N_{sc}$ symbols (or digital data) corresponding to $N_{sc}$ subcarriers.

The subcarrier de-interleaving unit 1550 may perform subcarrier de-interleaving for demodulating $N_{sc}$ symbols (or digital data) corresponding to $N_{sc}$ subcarriers randomly deployed to a meaningful sequence. The meaningful sequence generated through the subcarrier de-interleaving may include $N_G$ n-dimensional symbol vectors.

The frequency lattice demodulation unit 1570 may identify the $N_G$ n-dimensional symbol vectors from the sequence demodulated through the de-interleaving in the subcarrier de-interleaving unit 1550. The frequency lattice demodulation unit 1570 may generate digital data by demodulating the sequence received from the subcarrier de-interleaving unit 1550 on an n-dimensional symbol vector basis according to an FLM mapping table. For example, the frequency lattice demodulation unit 1570 may identify a symbol vector-1 from the sequence, and may de-map the symbol vector-1 to digital data corresponding to the symbol vector-1. The frequency lattice demodulation unit 1570 may generate the digital data by de-mapping each of the $N_G$ symbol vectors.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a local area network (LAN), a Wide LAN (WLAN), or a storage area network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a constitutional element included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of constitutional elements. Therefore, a constitutional element expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. A method performed by a device in a wireless environment, the method comprising:
   generating a codeword related to transmission data;
   generating symbols from the codeword by using a plurality of transmission symbol vectors determined using a linear combination of vectors corresponding to respective rows of a lattice generation matrix; and
   transmitting a signal generated based on the symbols via a transceiver.

2. The method of claim 1, wherein the lattice generation matrix includes a Barnes Wall lattice.

3. The method of claim 1, wherein the lattice generation matrix is n×n matrix, and
   wherein the plurality of transmission symbol vectors determined based on the lattice generation matrix are $n^{th}$ dimensional vectors, where n is a natural number.

4. The method of claim 1, wherein a coefficient of a linear combination of vectors corresponding to the respective rows of the lattice generation matrix is an integer number.

5. The method of claim 1, further comprising:
   distributing the codeword to a plurality of bit sets including a first bit set and a second bit set;
   determining a first transmission symbol vector corresponding to the first bit set among the plurality of transmission symbol vectors;
   determining a second transmission symbol vector corresponding to the second bit set among the plurality of transmission symbol vectors; and
   generating a signal on the basis of the first transmission symbol vector and the second transmission symbol vector.

6. The method of claim 5, wherein the first transmission symbol vector corresponds to a first subcarrier group including a plurality of subcarriers,
   wherein the second transmission symbol vector corresponds to a second subcarrier group including a plurality of subcarriers, and
   wherein the signal is generated by using at least one of the plurality of subcarriers included in the first subcarrier group and the plurality of subcarriers included in the second subcarrier group.

7. The method of claim 1, wherein the generating symbols comprises generating the symbols from the codeword by using the plurality of transmission symbol vectors determined using a linear combination of the vectors respectively corresponding to the rows of the lattice generation matrix or vectors respectively corresponding to columns of the lattice generation matrix.

8. The method of claim 1, wherein the plurality of transmission symbols are determined by a designated number in an ascending order of a size of a vector among vectors that can be generated with a linear combination of vectors respectively corresponding to the rows of the lattice generation matrix.

9. A method performed by a device in a wireless environment, the method comprising:
   receiving, via a transceiver, a signal generated based on symbols for a codeword related to transmission data;
   identifying the symbols on which the received signal is based according to a plurality of transmission symbol vectors determined using a linear combination of vectors corresponding to respective rows of a lattice generation matrix; and
   generating the transmission data related to the codeword on the basis of the identified symbols.

10. The method of claim 9, wherein the lattice generation matrix includes a Barnes Wall lattice.

11. The method of claim 9, wherein the received signal is generated based on a first transmission symbol vector and a second transmission symbol vector,
   a codeword related to transmission data is distributed to a plurality of bit sets including a first bit set and a second bit set, wherein the first transmission symbol vector corresponds to the first bit set among a plurality of transmission symbol vectors,
   wherein the second transmission symbol vector corresponds to the second bit set among the plurality of transmission symbol vectors.

12. A device in a wireless environment, comprising:
   a transceiver; and
   at least one processor operatively coupled to the transceiver,
   wherein the at least one processor is configured to:
      generate a codeword related to transmission data;
      generate symbols from the codeword by using a plurality of transmission symbol vectors determined using a linear combination of vectors corresponding to respective rows of a lattice generation matrix; and
      transmit a signal generated based on the symbols via the transceiver.

13. The device of claim 12, wherein the lattice generation matrix includes a Barnes Wall lattice.

14. The device of claim 12, wherein the lattice generation matrix is n×n matrix, and
   wherein the plurality of transmission symbol vectors determined based on the lattice generation matrix are $n^{th}$ dimensional vectors, where n is a natural number.

15. The device of claim 12, wherein a coefficient of a linear combination of vectors corresponding to the respective rows of the lattice generation matrix is an integer number.

16. The device of claim 12, wherein the at least one processor is further configured to:
   distribute the codeword to a plurality of bit sets including a first bit set and a second bit set;
   determine a first transmission symbol vector corresponding to the first bit set among the plurality of transmission symbol vectors;
   determine a second transmission symbol vector corresponding to the second bit set among the plurality of transmission symbol vectors; and
   generate a signal on the basis of the first transmission symbol vector and the second transmission symbol vector.

17. The device of claim 16, wherein the first transmission symbol vector corresponds to a first subcarrier group including a plurality of subcarriers,
   wherein the second transmission symbol vector corresponds to a second subcarrier group including a plurality of subcarriers, and
   wherein the signal is generated by using at least one of the plurality of subcarriers included in the first subcarrier group and the plurality of subcarriers included in the second subcarrier group.

18. The device of claim 12, wherein the processor is configured to generate the symbols from the codeword by using the plurality of transmission symbol vectors determined using a linear combination of the vectors respectively corresponding to the rows of the lattice generation matrix or vectors respectively corresponding to columns of the lattice generation matrix.

19. The device of claim 12, wherein the plurality of transmission symbols are determined by a designated number in an ascending order of a size of a vector among vectors that can be generated with a linear combination of vectors respectively corresponding to the rows of the lattice generation matrix.

20. The device of claim 12, wherein the lattice generation matrix is n×n matrix, and
   wherein the plurality of symbol vectors, determined based on the lattice generation matrix, are $n^{th}$ dimensional vectors, where n is a natural number.

* * * * *